(12) United States Patent
Rinderer et al.

(10) Patent No.: US 6,547,192 B2
(45) Date of Patent: Apr. 15, 2003

(54) CABLE TRAY JUNCTION

(75) Inventors: Eric R. Rinderer, Highland, IL (US); Bruce A. Neace, Belleville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/793,008

(22) Filed: Feb. 26, 2001

(65) Prior Publication Data

US 2002/0117586 A1 Aug. 29, 2002

(51) Int. Cl.[7] .................................................. F16L 3/00
(52) U.S. Cl. .......................................... 248/49; 248/58
(58) Field of Search ............................. 248/58, 53, 49, 248/68.1; 52/220.3, 220.6

(56) References Cited

U.S. PATENT DOCUMENTS

| | | | |
|---|---|---|---|
| 2,834,622 A | | 5/1958 | Reeves |
| 2,860,742 A | | 11/1958 | Waters, Sr. et al. |
| 2,905,416 A | * | 9/1959 | Wiegand ...................... 248/58 |
| 3,022,972 A | * | 2/1962 | Bunston ...................... 248/68 |
| 3,351,699 A | | 11/1967 | Merckle |
| 3,618,882 A | | 11/1971 | Podedworny |
| 5,067,678 A | * | 11/1991 | Henneberg et al. ........ 248/68.1 |
| 5,169,099 A | * | 12/1992 | Yang ........................... 248/49 |
| 5,316,244 A | | 5/1994 | Zetena, Jr. |
| 5,564,658 A | | 10/1996 | Rinderer |
| 5,580,014 A | | 12/1996 | Rinderer |
| 5,628,481 A | * | 5/1997 | Rinderer ...................... 248/58 |
| 5,731,546 A | | 3/1998 | Miles et al. |
| 5,782,439 A | | 7/1998 | Rinderer |
| 5,816,542 A | | 10/1998 | Rinderer |
| 5,917,982 A | * | 6/1999 | Vargase et al. ............. 385/134 |
| 5,992,802 A | * | 11/1999 | Campbell ................... 248/68.1 |
| 6,068,220 A | * | 5/2000 | Alrey ........................... 248/49 |

OTHER PUBLICATIONS

PUK Kabelverlegungs—Systeme Kabelbahnen Cable trays Chemins de cables, Katalog '93, admitted prior art.
FAST–track, Davis Total Cable Management, pp. 9 and 11, admitted prior art.
SWiFTS Products Guide, pp. 9 and 15, admitted prior art.

* cited by examiner

Primary Examiner—Ramon O. Ramirez
Assistant Examiner—Kofi Schulterbrandt
(74) Attorney, Agent, or Firm—Senniger, Powers, Leavitt & Roedel

(57) ABSTRACT

A junction for the joinder of convergent cable trays. The junction comprises a panel for interconnection of the trays, and at least one cable guide extending up from an upper face of the panel having a curved surface for guiding cable as it is pulled around from one tray to another. The curvature of the surface is such as to enable the bending of the cable as it is pulled around the curved surface while preserving the integrity of the cable. The junction includes several different features. In one feature, the cable guide is removably fastened on the panel.

63 Claims, 26 Drawing Sheets

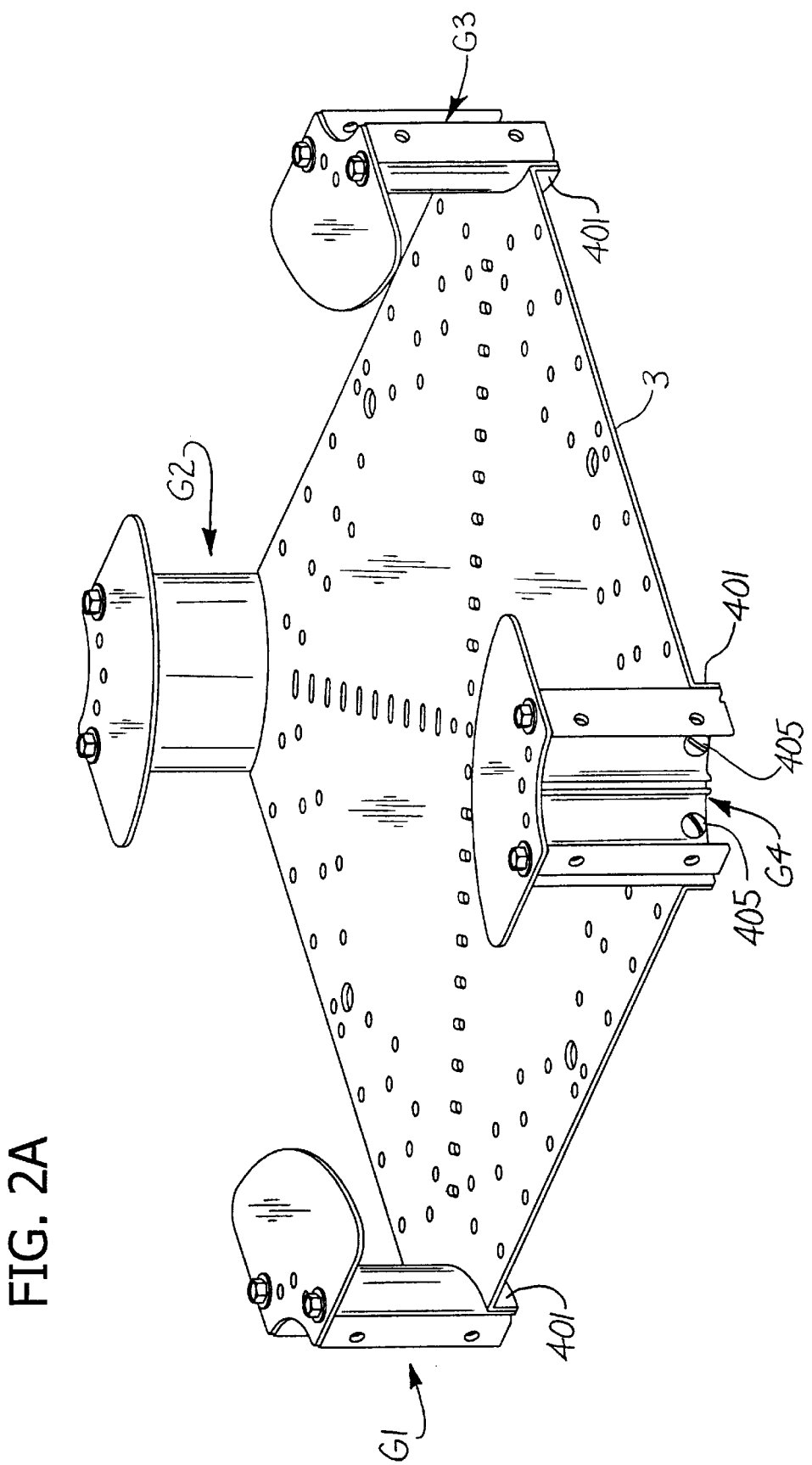

CABLE TRAY JUNCTION

BACKGROUND OF THE INVENTION

This invention relates to junctions (which may also be termed "fittings" or "splices") for the joinder of cable trays in cable tray systems wherein cable (or bundles thereof), including electrical cable or conduit, data transmission cable and the like, is strung.

The invention is especially directed to a junction for interconnection of convergent cable trays in a cable tray system wherein, in the stringing of the cable (or bundles thereof) in the trays, the cable may be pulled around from one tray to another tray at an angle to the one tray.

Reference may be had to Rinderer U.S. Pat. No. 5,782,439 issued Jul. 21, 1998 entitled Support System for Transmission Lines and Cable and to Rinderer U.S. Pat. No. 5,816,542 issued Oct. 6, 1998 entitled Support System for Data Transmission Lines for a showing of cable tray systems such as may be encountered in the field involving an arrangement of trays in which a junction of this invention may be used, as well as a showing of certain types of trays such as may be encountered. Reference may also be made to Rinderer U.S. Pat. No. 5,580,014 issued Dec. 3, 1996 entitled Ladder-Type Cable Tray for a showing of another type of cable tray such as may be encountered in such systems. These three patents are incorporated herein by reference.

Avoiding damage to cable in being pulled around from one tray to another at an angle thereto (usually a right angle), and thus subjected to bending, has been a problem, particularly with regard to data transmission cable, sharp bending of the latter being apt to adversely affect its data transmission capability. Compounding the problem, cable tray systems involving different types of cable trays, different sizes of cable trays, and different arrangements of trays may be encountered.

SUMMARY OF THE INVENTION

Among the several objects of the invention may be noted the provision of an improved junction for joinder of cable trays; the provision of such a junction which is adapted as supplied and without requiring extras or taking special steps to enable pulling cable around from one tray to another in a manner avoiding damage to the cable (e.g., in the case of data transmission cable, avoiding distortion of the quality of the data transmissability thereof); the provision of such a junction for joinder of cable trays in different configurations, particularly in L-formation, T-formation or cruciform formation; the provision of such a junction which is relatively economical to manufacture and convenient and economical to install; the provision of such a junction applicable to cable tray systems having trays of different widths and heights; and the provision of a juncture for multi-level trays.

In one aspect, a junction of this invention for the joinder of convergent cable trays comprises a panel for interconnection of the trays with one face of the panel facing upwardly thereby constituting its upper face, and at least one cable guide extending up from said upper face of the panel having a curved surface for guiding cable as it is pulled around from one tray to another. The curvature of this surface is such as to enable the bending of the cable as it is pulled around the curved surface while preserving the integrity of the cable. The guide is removably attached to the panel.

One junction of this invention is adapted for connection of two cable trays in L-formation, three cable trays in T-formation, or four cable trays in cruciform formation. The junction comprises a plate for interconnection of two, three or four trays with one face of the plate facing upwardly thereby constituting its upper face. The plate has a plurality of sides, a plurality of corners, and a plurality of cable guides extending up from the upper face of the plate, adjacent the corners. Each of the guides has a curved surface for guiding cable as it is pulled around from one tray to another at right angles thereto, the curvature of the curved surface being such as to enable the bending of the cable as it is pulled around the curved surface while preserving the integrity of the cable.

Another aspect of the present invention is directed to a junction system for the joinder of cable trays each comprising a rail having supports for supporting cable at different levels. The junction system includes a plurality of junctions, each comprising a plate for interconnection of two, three or four cable trays with one face of the plate facing upwardly thereby constituting its upper face. The plate has a plurality of sides, a plurality of corners, and a plurality of cable guides extending up from the upper face of the plate, adjacent the corners. Each of the guides has a curved surface for guiding cable as it is pulled around from one tray to another at right angles thereto, the curvature of the curved surface being such as to enable the bending of the cable as it is pulled around said curved surface while preserving the integrity of the cable. The upper faces of the plates of the junctions are generally in planes at different levels corresponding to the different levels of the cable.

The present invention also features a junction for connection of two cable trays in L-formation, three cable trays in T-formation, or four cable trays in cruciform formation. The junction comprises a plate for interconnection of two, three or four trays with one face of the plate facing upwardly thereby constituting its upper face. The plate has a plurality of sides, a plurality of corners, and a plurality of cable guides extending up from the upper face of the plate, adjacent the corners. Each cable guide is removably fastened on the plate by fasteners extending up through preformed holes in the plate arranged in a predetermined pattern.

In another aspect, the junction has four cable guides extending up from the upper face of the plate, one adjacent each corner, and each cable guide has a top retainer extending inward with respect to the plate for confining cable thereto.

Another feature of the junction is that the cable guides are removably fastened on a plate by fasteners extending up through holes in a predetermined pattern. The plate has sets of preformed holes each in the aforesaid pattern along each of the sides for fastening one or more of the guides on the plate in position spaced inward from a corner.

In still another embodiment, the plate has four sides, four corners, and four cable guides extending up from the upper face of the plate, one adjacent each corner. The guide is formed for connection to selected pairs thereof of one type of cable tray, and the plate is formed on each side thereof for connection of other types of cable tray.

The cable guides of the junctions of the present invention are preferably about 1–6 inches high. Also, the guides of a particular junction are of different height to accommodate cable tray of different sizes.

Another embodiment of the present invention involves a junction for connection of two or more converging cable trays. The junction comprises a panel having an upper face, a plurality of sides, a plurality of corners, a plurality of cable guides extending up from the upper face adjacent said corners, and a cover adapted to be removably fastened to the cable guides in a covering position overlying the panel and spaced therefrom. The cable guides have cover fastener openings therein for receiving fasteners to removably fasten the cover in said covering position.

In an additional embodiment, a junction of this invention comprises a panel having an upper face, a plurality of sides, a plurality of corners, and a plurality of cable guides extending up from the upper face adjacent the corners. The cable guides have accessory fastener openings therein for releasably fastening accessories to the cable guides.

Other objects and features will be in part apparent and in part pointed out hereinafter.

BRIEF DESCRIPTION OF THE DRAWINGS

FIG. 2A is a view similar to FIG. 1 but showing a different arrangement for fastening the cable guides to the plate;

Corresponding reference characters indicate corresponding parts throughout the several views of the drawings.

DETAILED DESCRIPTION

Figure 1:
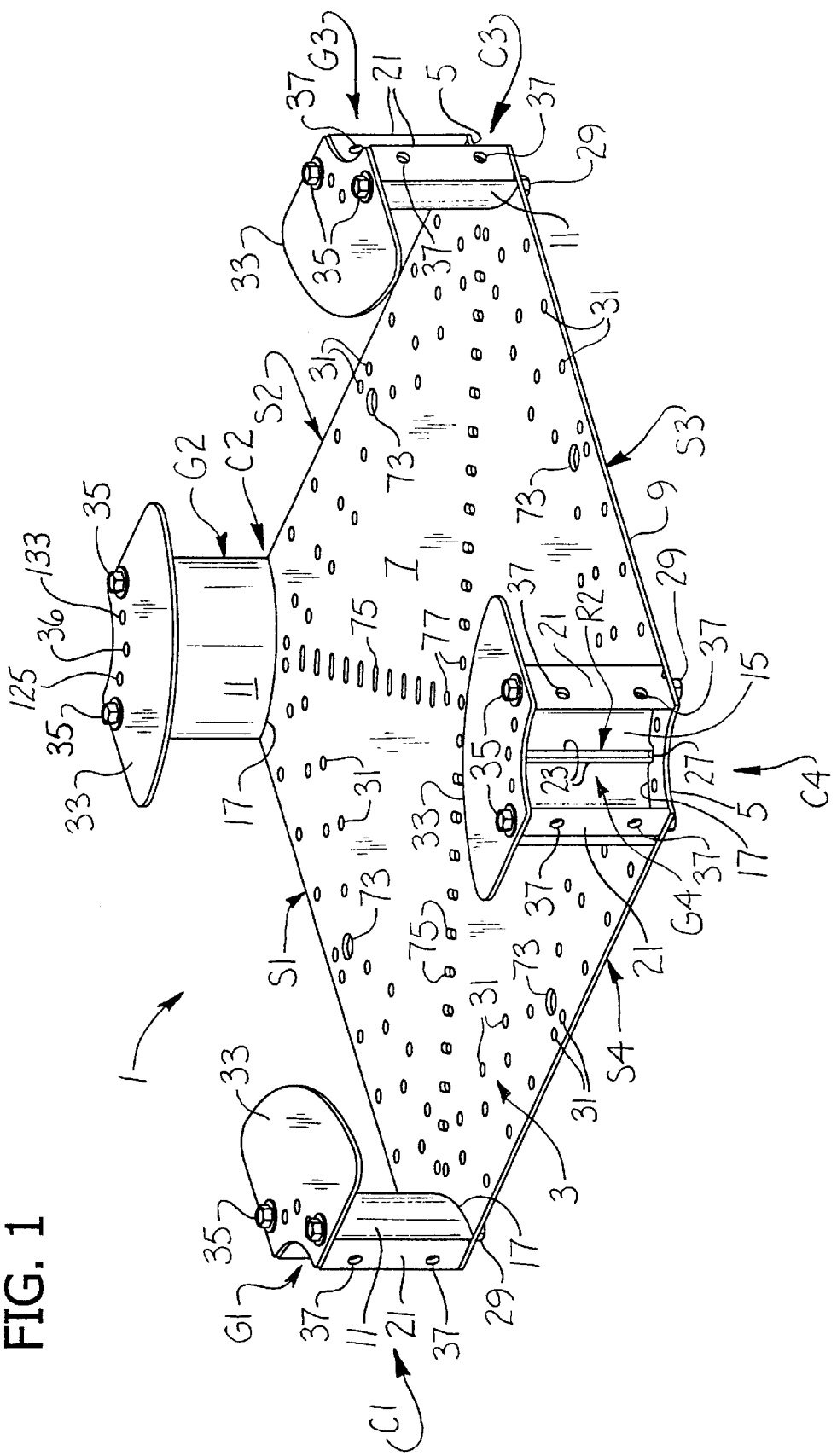
FIG. 1 is a perspective of a junction of this invention comprising a panel constituted by a perforated four-sided plate with four cable guides thereon, one at each corner of the plate, each guide having a retainer thereon for confining cable being pulled therearound.
Figure 8:
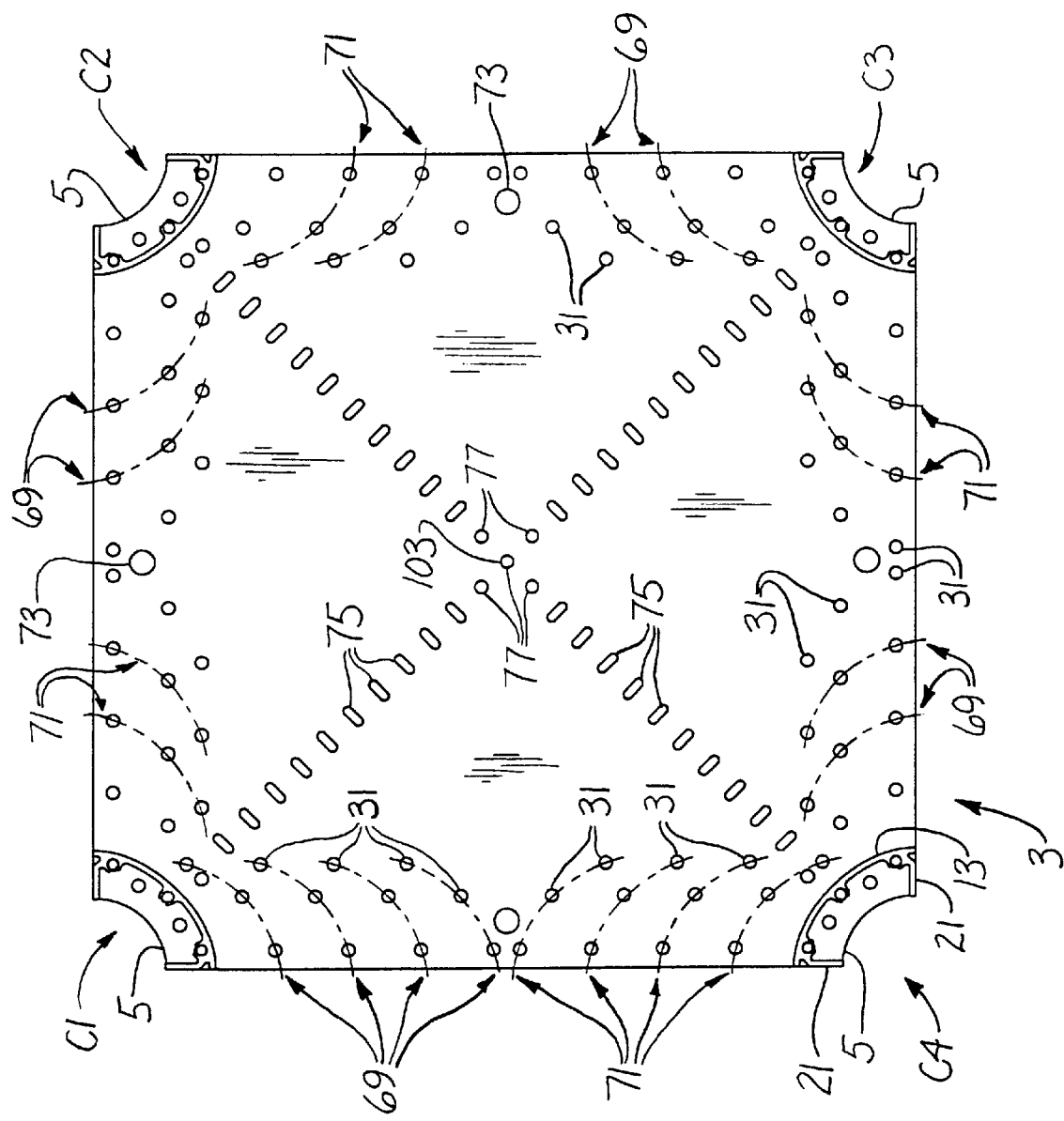
FIG. 8 is a plan of FIG. 2.

Referring to FIG. 1 of the drawings, a cable tray junction of this invention, generally designated in its entirety by the reference numeral 1, is shown to comprise a panel which, in the embodiment of FIG. 1, is a plate 3 of generally square outline thereby having four sides S1, S2, S3, S4 at right angles to one to another meeting at four corners C1, C2, C3, C4. Each of these corners has a quarter-circle cutaway 5 as best illustrated in FIG. 8. Sides S2 and S4 extend at right angles to side S1 and S3; side S3 is opposite from S1; side S4 is opposite S2. The plate 3 is adapted for installation in generally horizontal position at the junction of two cable trays indicated in phantom at T1 and T2 in FIG. 4 extending at right angles to one another in L-formation, or three cable trays T1, T2 and T3 with T2 and T3 in line in T-formation (See FIG. 5), or four trays T1a, T2a, T3a, T4a with T1a and T3a in line with each other and T2a and T4a in line with each other in cruciform formation (see FIG. 6). So installed, one face 7 of the plate faces upward, constituting its upper face, its other face constituting its lower face being designated 9. The dimensions of the plate are not critical. By way of example, the plate may be a square plate having a side dimension of 6 in., 9 in., 12 in., 18 in., 24 in., or 36 in. The thickness of the plate may vary from $1/16$ in. to $3/16$ in. These dimensions should not be considered to be all-inclusive or limiting in any way. The plate may be formed from a suitable material, such as metal (e.g., 6063T6 aluminum).

Extending upward from the upper face adjacent each of the four corners C1–C4 of the plate 3 is a cable guide, the four guides being designated G1, G2, G3, G4. Each of the four guides has a smooth curved (arcuate) surface 11 for guiding cable as it is pulled around from one tray to another. The curvature of the surface 11 is such as to enable the bending of the cable as it is pulled around surface 11 while preserving the integrity of the cable. In particular, as to installation of data transmission cable and the pulling thereof around from one tray to another, the curvature is such as to enable the bending of the data transmission cable around a corner from one tray to another without adversely affecting its data transmission quality. Specifics of the preferred curvature are subsequently detailed.

Figure 2:
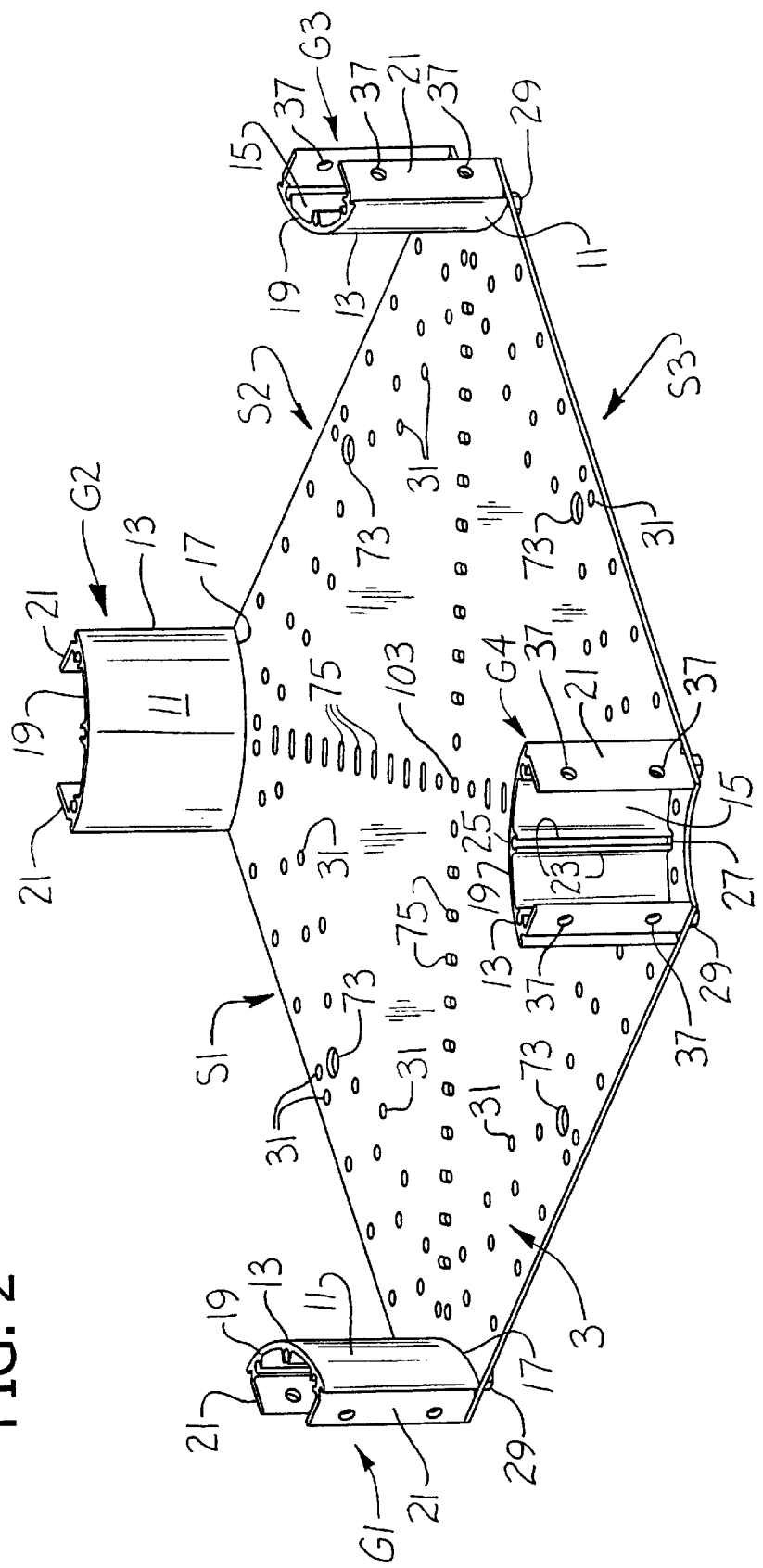
FIG. 2 is a view like FIG. 1 without the retainers.
Figure 11A:
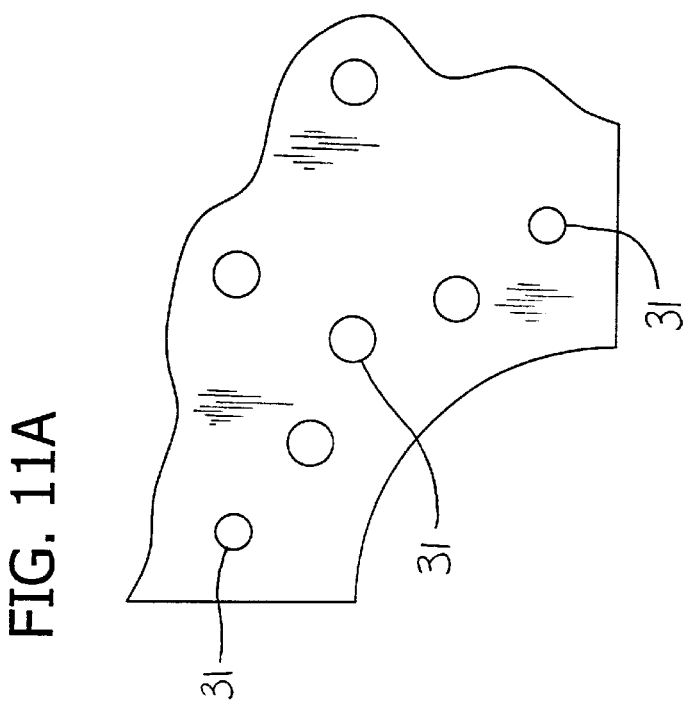
FIG. 11A is a view corresponding to FIG. 11 with the cable guide which appears in FIG. 11 removed.
Figure 11:
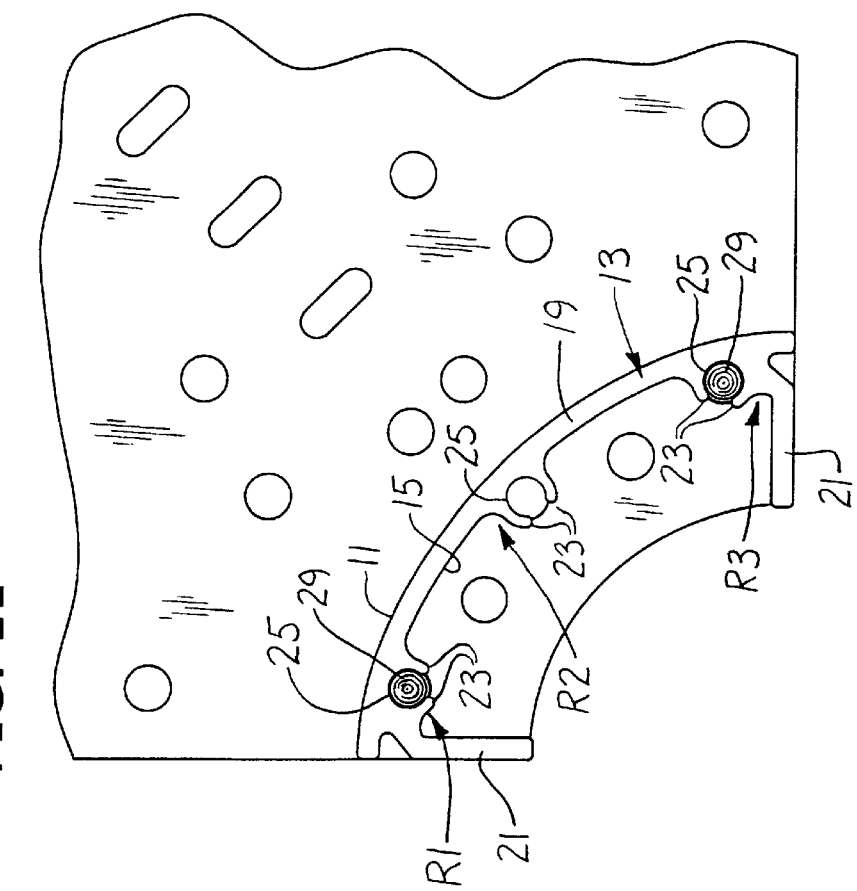
FIG. 11 is an enlarged fragment of FIG. 8 (one corner thereof)
Figure 23:
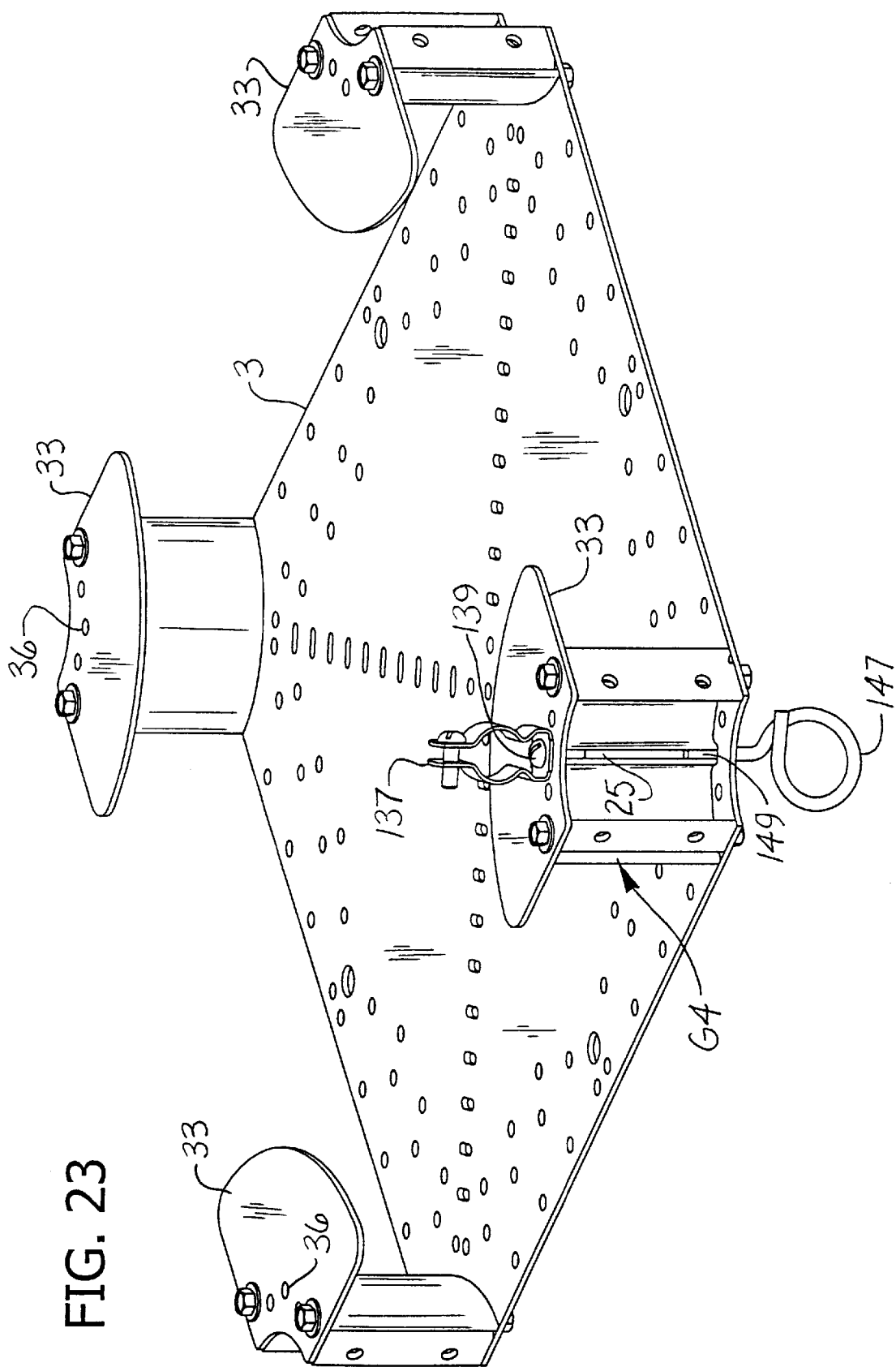
FIG. 23 is a perspective of a junction with accessories optionally attached to the cable guides.

Each of the four cable guides G1–G4 (they are identical in the embodiment of FIGS. 1 and 2) comprises a curved strip 13 extending about a 90° arc of a circle and having a convex side presenting the aforesaid curved surface 11 and a concave side 15, a bottom edge 17, a top edge 19 and end flanges each designated 21 extending outward from the concave side 15 in radial planes (radial with respect to the circle of curvature of the strip) at about right angles to one another. The strip 13 is formed with three pairs R1, R2 and R3 of ribs, each rib being designated 23 (FIG. 11). The ribs R1, R2, R3 extends heightwise on the concave side 15 of strip 13 and form a series of three screw holes, each designated 25, extending down from the top of the strip 13 spaced at intervals along the arc of the strip and a series of three screw holes each designated 27 extending up from the bottom of the strip coaxial with holes 25. Each guide G1–G4 is removably fastened on the plate 3 at its respective corner of the plate extending around the corner, with the convex surface 11 thereof facing diagonally inwardly with respect to the plate, by self-tapping screws 29 extending up through screw holes 31 therefor (see FIG. 11A) in the plate 3 threaded in the screw holes 27. In one embodiment, two of the three holes 27 in each cable guide are used for screws 29 to mount the cable guide on the plate 3, leaving the center hole 27 of the cable guide free for use in attaching an accessory to the cable guide, as will be described in detail later (FIG. 23). Alternatively, all three screw holes 27 could be used to attach the cable guide to the plate 3.

The cable guides G1–G4 could be removably fastened to the plate 3 in other ways. For example, the cable guides could be secured in place by fasteners other than self-tapping screws. Also, the screw holes 27 could be formed in ways other than by ribs 23, and the fasteners could be oriented horizontally rather than vertically, as illustrated in FIG. 2A. In this embodiment, the plate 3 is formed with vertical fastening flanges 401 at the corners of the plate, each of which is adapted to mate with the curved surface 11 of a corresponding cable guide G1–G4. The cable guides are secured to the flanges 401 by one or more suitable fasteners 405 (e.g., nut a bolt fasteners). Other fastening configurations may also be used.

The strips 13, with the ribs 23 and the flanges 21, may be readily formed by extruding a suitable metal, for example 6063T6 aluminum, in a continuous strip of the requisite cross-section and segmenting (slicing) the continuous strip into individual strips 13. The convex surface 11 formed in the extrusion (around which surface cable is guided in being pulled) is a cylindrical surface (one-fourth of a cylinder) extending about 90° of arc on a radius of from about 1 to 6 inches, a minimum radius being about 1.0 inch, with the preferred radius being about three inches.

Figure 3:
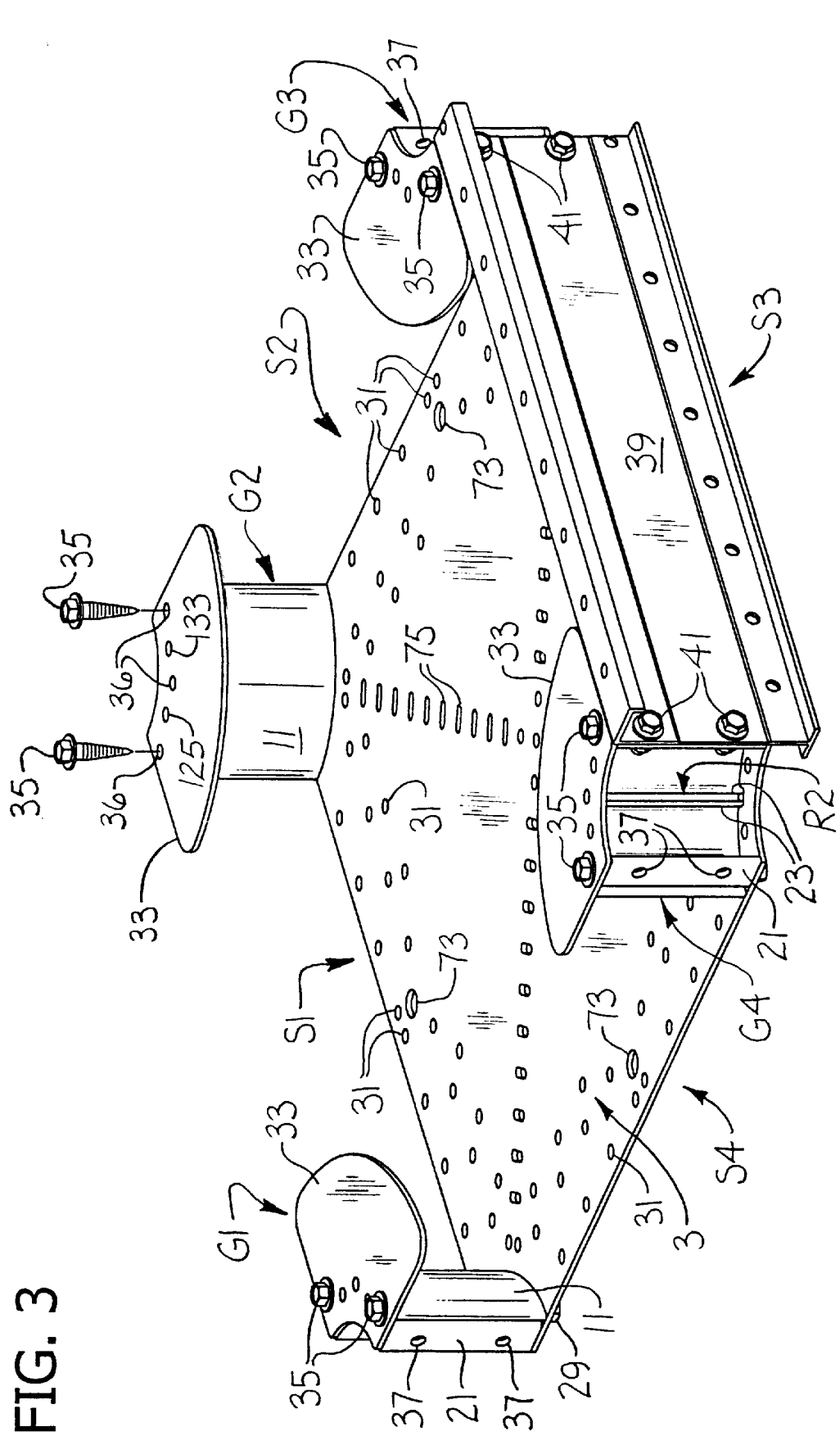
FIG. 3 is a view like FIG. 1 showing the junction with a side wall.

As shown in FIGS. 1, 3 and elsewhere, each cable guide G1–G4 is provided with a retainer 33 on the top 19 thereof extending in from its convexly curved surface 11 for confining cable to said curved surface. This retainer comprises a flat flange constituted by a plate having the general shape of one-quarter of a circle removably fastened on the top of the guide (on the flat top edge 19 of strip 13) by self-tapping screws 35 extending down through screw holes 36 in plate 33 into the end screw holes 25 at the top of the guide. In the embodiment shown in FIGS. 1 and 3, two screws 35 are used to secure the retainer plate 33 in place, leaving a third screw hole 36 in the retainer plate and a third screw hole 25 in the guide vacant for the optional attachment of an accessory to the cable guide, as will be described later (FIG. 23).

Figure 4:
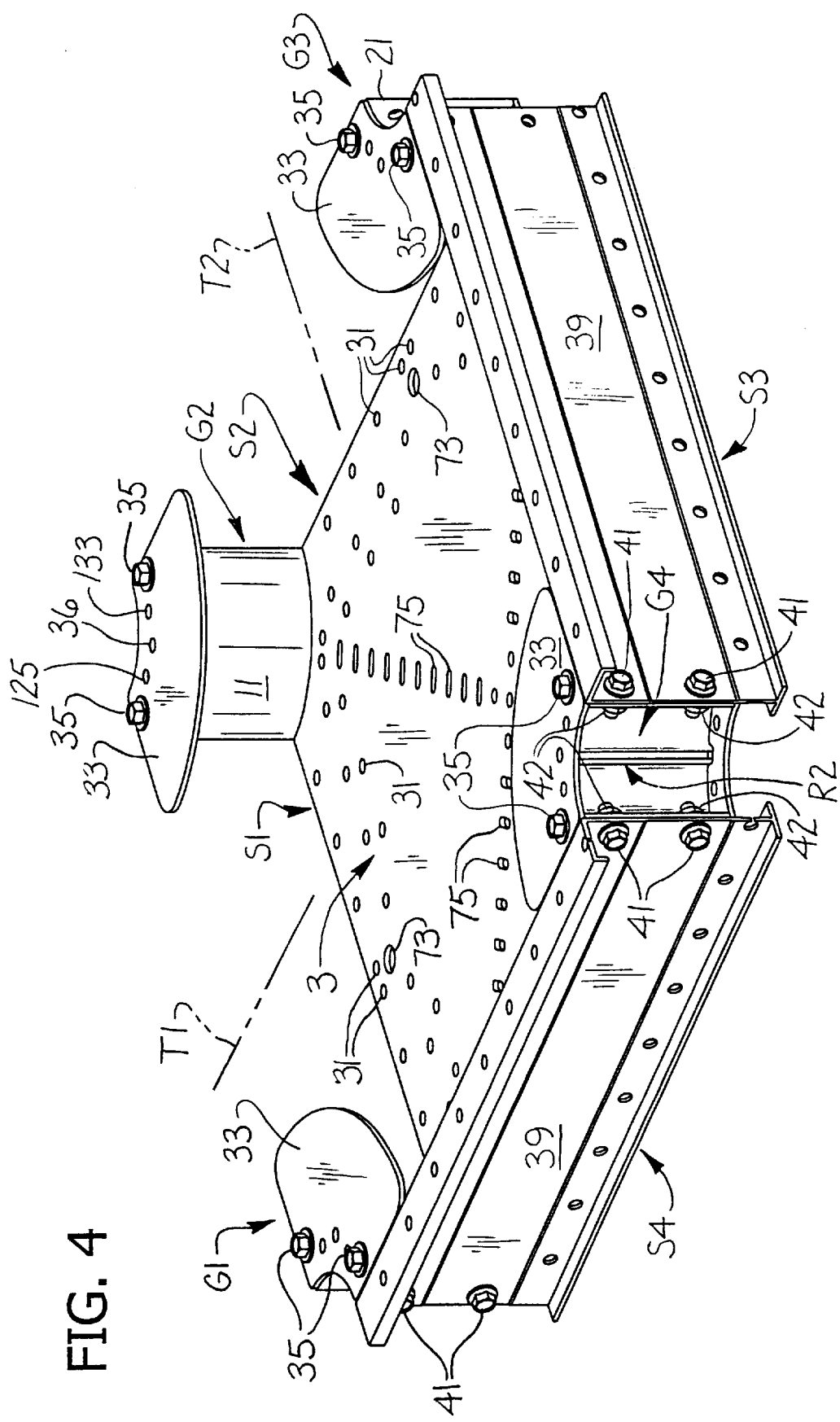
FIG. 4 is a view like FIG. 3 showing the junction with a second side wall.

Each of the end flanges 21 of each guide G1–G4 (i.e., the end flanges 21 of each strip 13) is provided with two screw holes each designated 37 for use in making attachments thereto as will appear. One such use is illustrated in FIGS. 3 and 4, FIG. 4 illustrating the attachment on the two sides S3, S4 of the junction 1 which meet at corner C4 of side walls 39, the junction generally being supplied with these side walls in place. The side wall on side S3 is removably attached to the flanges 21 of guides G3 and G4 which lie generally coplanar with side S3 of plate 3 by machine screws 41 extending through holes 37 in these flanges, and nuts 42 tightened on the screws. In one embodiment, the machine screws 41 have heads with integral washers. Alternatively, separate washers could be used, or the washers could be eliminated entirely. Similarly, the side wall on side S4 is removably attached to the flanges 21 of guides G4 and G1 which lie generally coplanar with side S4 of plate 3 by machine screws 41 threaded in holes 37 in the latter flanges, and by nuts 42 threaded up on the screws. FIG. 3 illustrates the junction 1 with the side wall 39 on side S4 removed and only the side wall 39 on side S3 in place (for a T-formation). Another use for flanges 21 and their holes 37 is for attachment of cable trays with the junction, such as in the T1, T2, T3 T-formation shown in FIG. 5.

Figure 5:
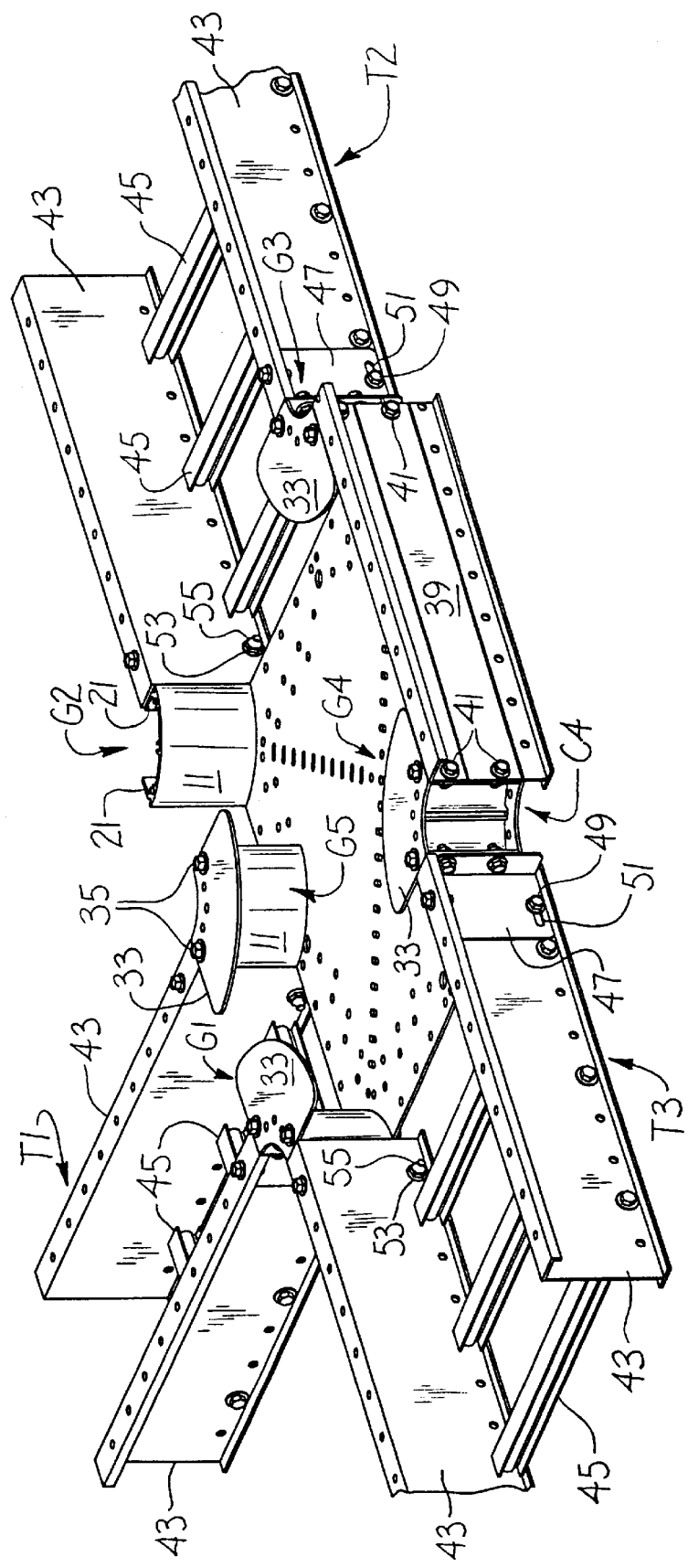
FIG. 5 is a perspective showing the junction with one side wall at the convergence of three cable trays all of the same type but one narrower than the other two in a T-formation, and showing a fifth cable guide fastened on the plate to accommodate the narrow tray.
Figure 19:
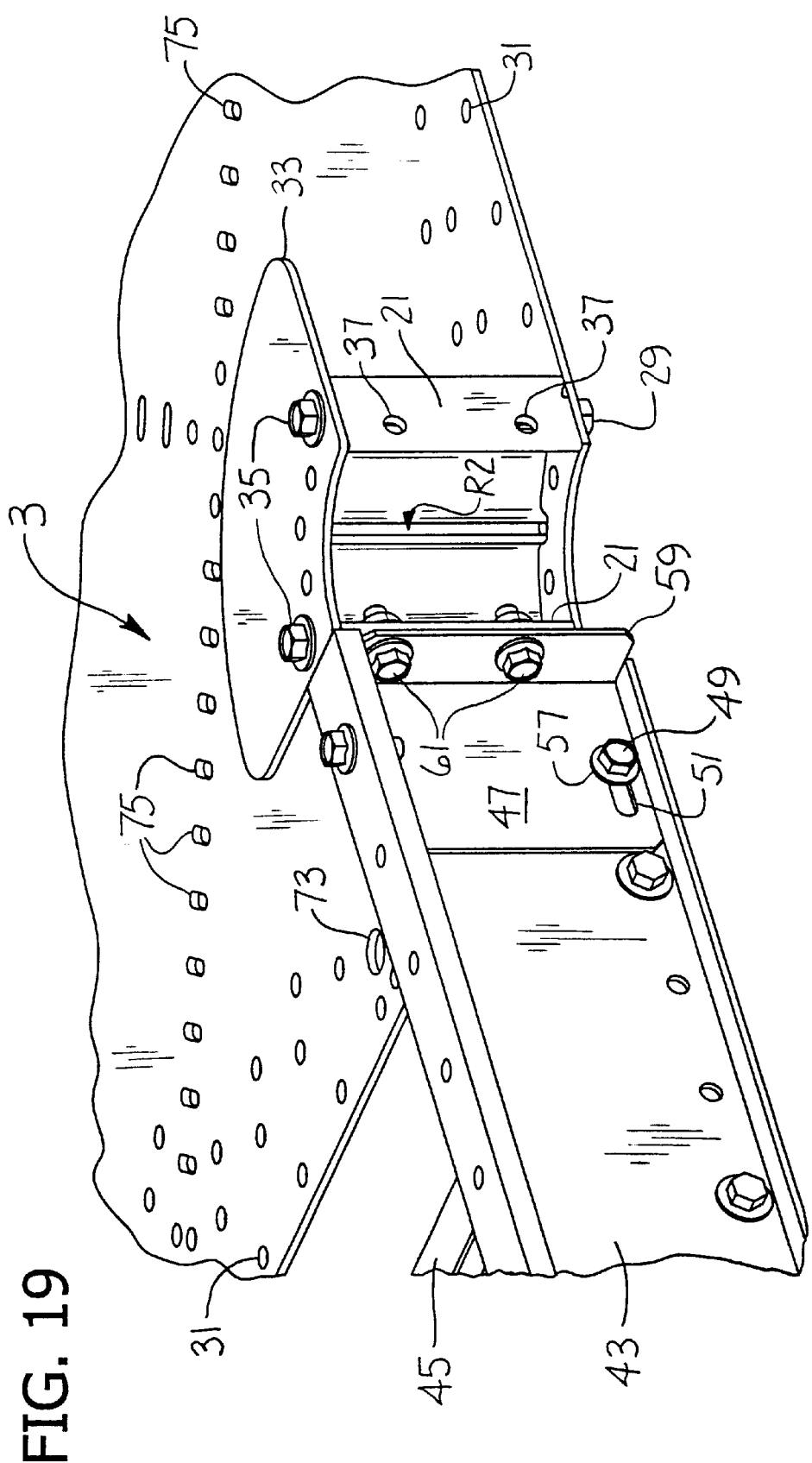
FIG. 19 is a fragmentary perspective of the joinder of one side of a cable tray to one of the cable guides.
Figure 20:
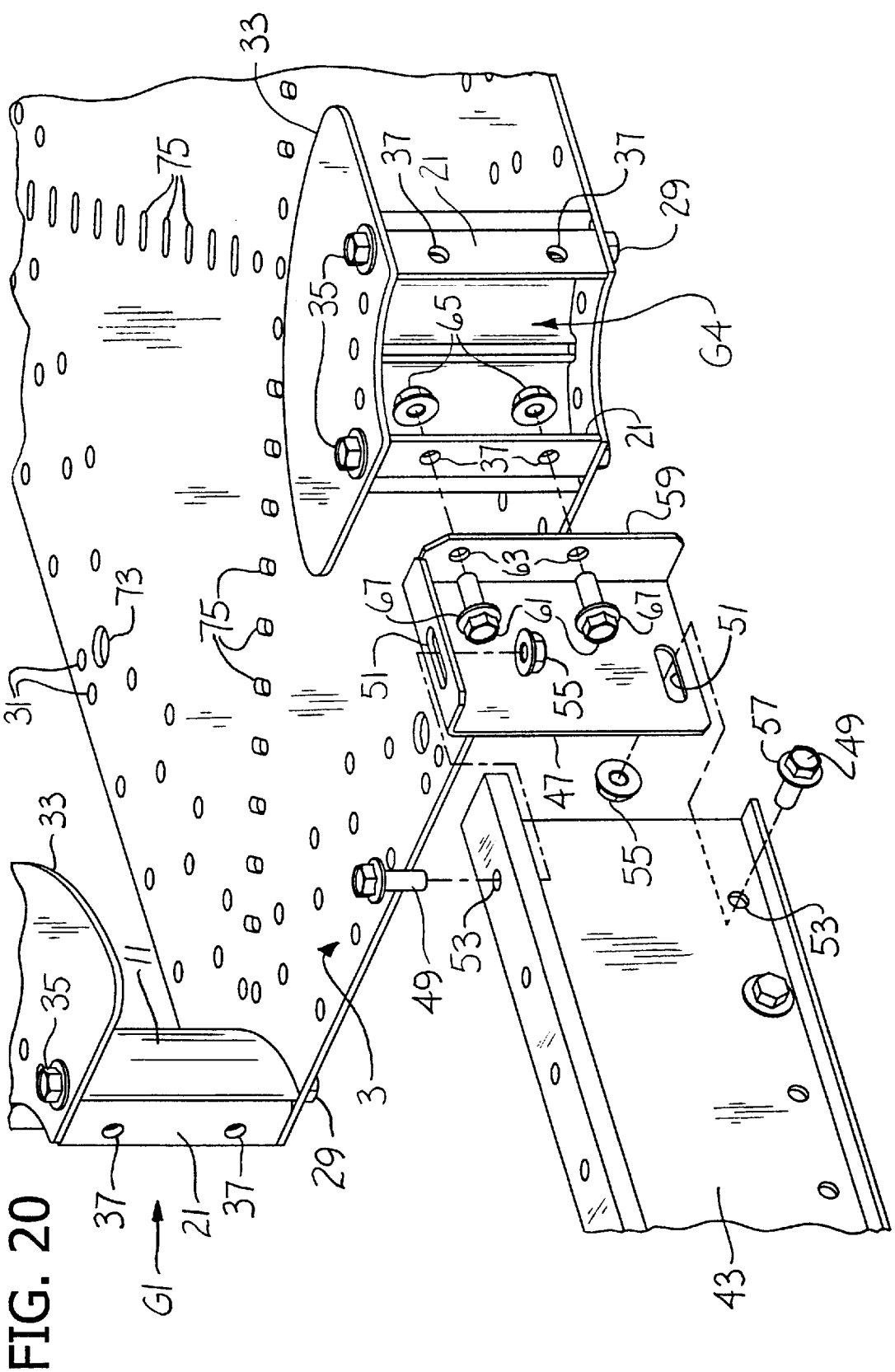
FIG. 20 is an exploded version of FIG. 19.

Referring to FIG. 5, each of the three cable trays T1, T2, T3 is shown as being of the type referred to as a Ladder-Type Cable Tray such as shown in the aforesaid U.S. Pat. No. 5,580,014 comprising a pair of generally parallel spaced-apart metal (e.g. aluminum) side rails 43 and metal (aluminum) rungs 45 extending between the rails at intervals spaced along the rails. As shown, each of the trays T2 and T3 is a full-width tray, i.e., the width of T2 corresponds to the distance between the end flanges 21 of guides G2 and G3 in their widespread location and the width of T3 corresponds to the distance between the end flanges 21 of guides G1 and G4, but T1 as shown in FIG. 5 is a somewhat narrower tray. Each of trays T2 and T3 has a flanged connector plate 47 (see also FIGS. 19 and 20) at the junction end of each rail held in a position of adjustment longitudinally of the rail by bolts 49 extending through slots 51 in the connector plate and bolt holes indicated at 53 in the respective rail with nuts 55 threaded up tight on the bolt. In one embodiment, the bolts 49 have heads formed with integral washers 57. Alternatively, separate washers could be used, or the washers could be eliminated entirely. Plate 47 has a flange 59 for engagement with a respective flange 21 and fastening thereto by bolts 61 extending through bolt holes 63 in the flange 59 and holes 37 in the respective flange 21, nuts 65 being threaded up tight on the bolts in FIG. 5. Preferably, the bolts 61 have heads formed with integral washers 67, but it will be understood that separate washers could be provided, or the washers could be eliminated.

In view of tray T1 in FIG. 5 being a relatively narrow tray (narrower than each of the four sides of plate 3), an extra cable guide G5 is removably fastened to the plate in similar manner to the manner in which each of guides G1–G4 is removably fastened on the plate 3 for guidance of a cable being pulled around from tray T1 to tray T2 or from T2 to T1. For attachment of an extra guide such as G5 in various positions spaced in from any one of the four corners C1–C4, and for replacement of guides G1–G4 in position spaced in from respective corners (for attachment of small-width trays like tray T1 shown in FIG. 5), plate 3 is provided along each side thereof with a first series of sets 69 (see FIG. 8) of screw holes 31 (for screws 29), said sets being spaced at intervals about halfway along the respective side of the plate from one corner, and a second series of sets 71 of screws holes 31 (for screws 29), said sets 71 being spaced at intervals about half way along the respective side of the plate from the other corner on that side. Each set comprises three screw holes 31 in the same pattern as the three holes 31 at each corner. It is to be understood that there are sets 69 and 71 along each of the four sides S1–S4 of the plate 3, the latter also having a tray attachment hole 73 on each of the four sides S1–S4 midway thereof, holes 75 on both diagonals for receiving ties for tying cables down to the plate or for other attachments, and a pattern of holes 77 at the center.

Figure 6:
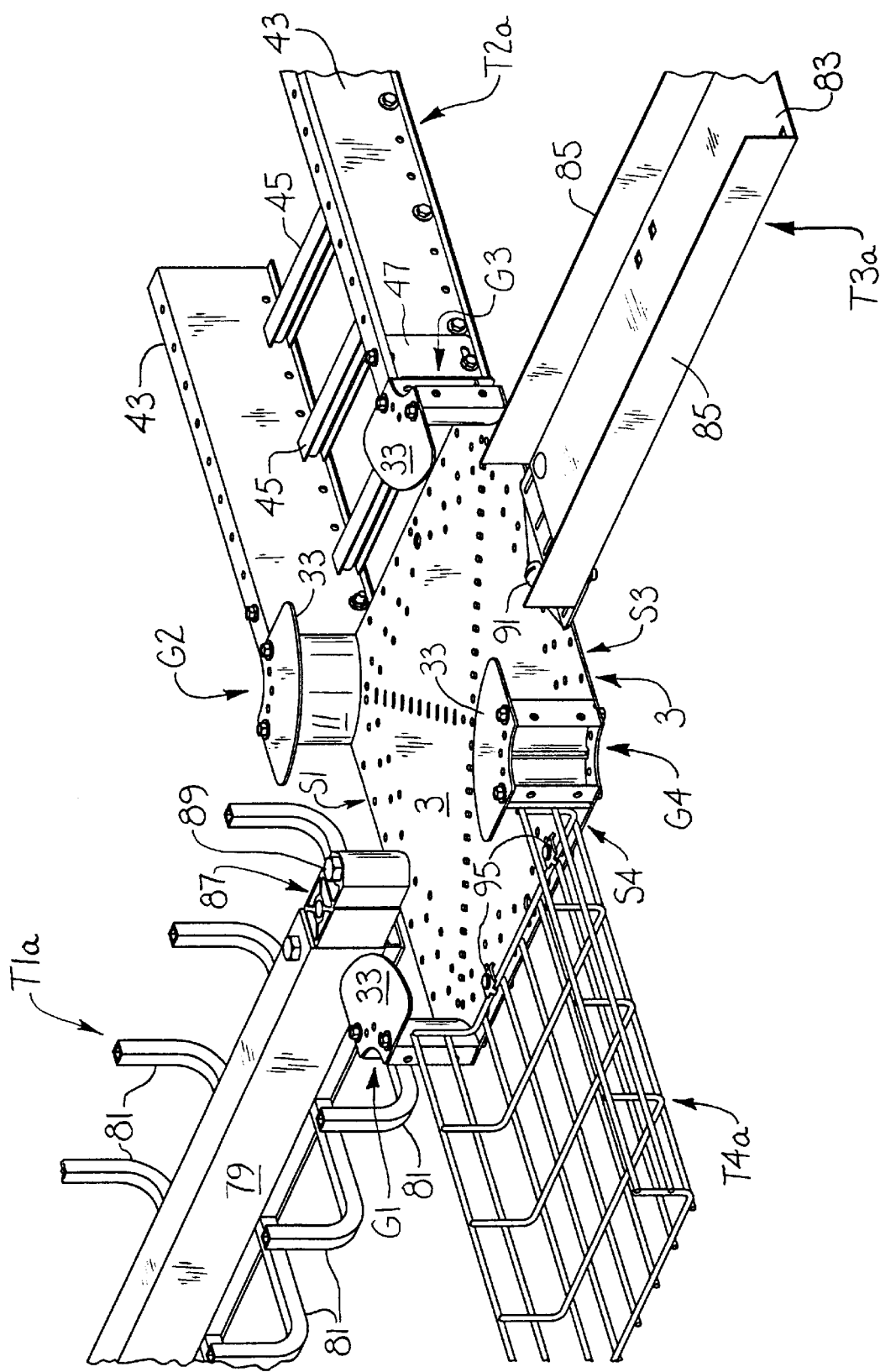
FIG. 6 is a perspective showing the FIG. 1 junction at the convergence of four cable trays of four different types in a cruciform formation.
Figure 7:
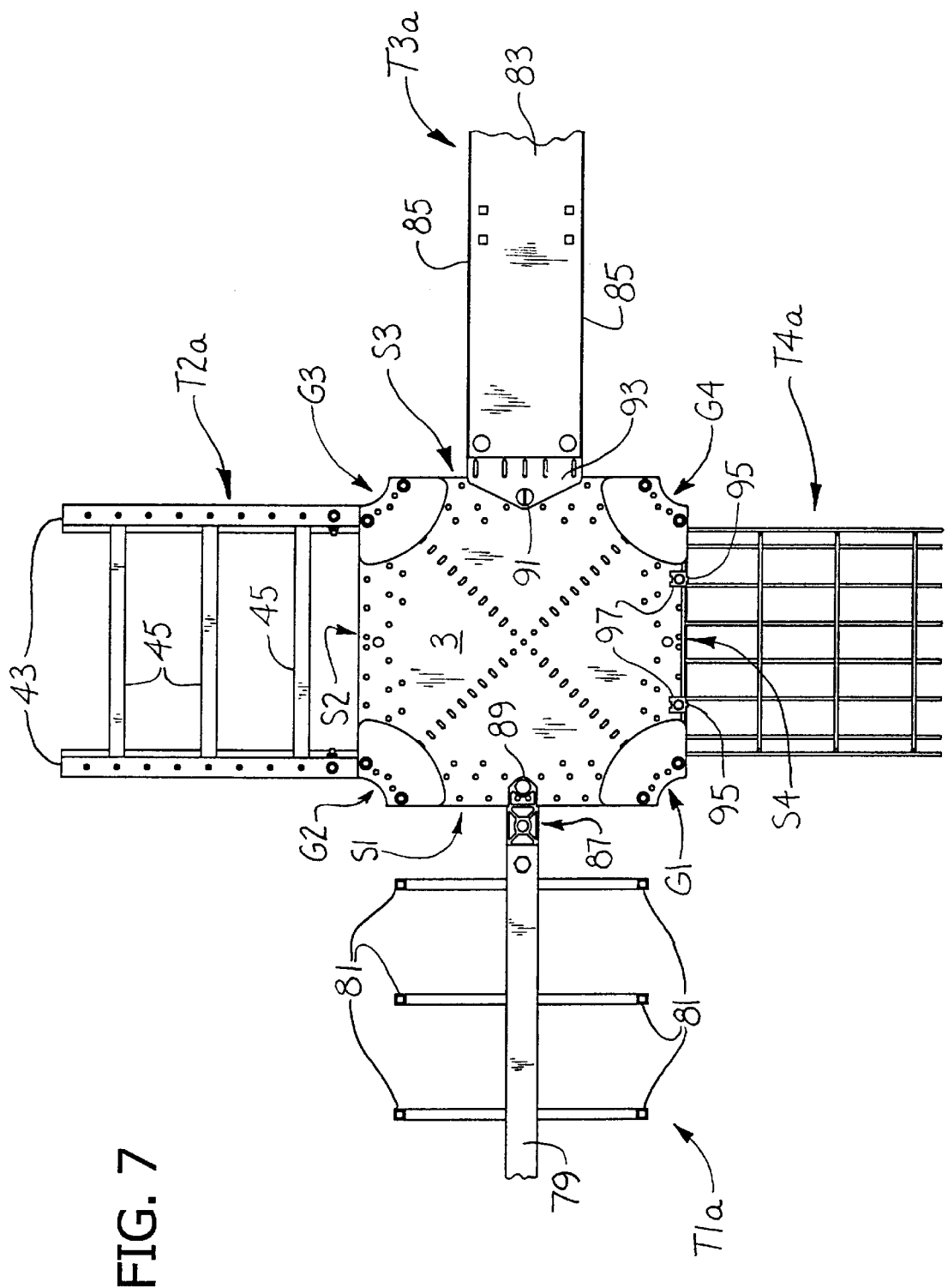
FIG. 7 is a plan of FIG. 6.

FIGS. 6 and 7 show a cruciform formation with junction 1 interconnecting four cable trays T1a–T4a each of a different type such as may be encountered. Tray T1a shown in FIGS. 6 and 7 as attached on side S1 of the plate 3 is of the type shown in the aforesaid U.S. Pat. No. 5,782,439 and in FIGS. 17–22 of the aforesaid U.S. Pat. No. 5,816,542 comprising a rail 79 and a series of arms 81 (which may also be termed rungs) extending laterally outward from the rail for supporting cable. Tray T2a (attached to side S2) is of the ladder type comprising side rails 43 and rungs 45. Tray T3a is of a sheet metal channel type having a web 83 and upstanding side flanges 85 and T4a is of a type comprising a channel made of wire. Both of the side walls 39 are removed for installation of the junction 1 in cruciform formation involving connection of the ends of the four trays T1a–T4a where they converge to respective sides S1–S4 of plate 3. Tray T1a has a splice member 87 at the junction end thereof similar to that designated 80 in U.S. Pat. No. 5,782,439 and that designated 217 in U.S. Pat. No. 5,816,542 fastened on plate 3 by a bolt 89 extending through the hole 73 adjacent the center of side S1 of the plate 3. Tray T2a is fastened to the cable guides G2 and G3 in the manner previously described above for T2 in FIG. 5. Trays T3a and T4a are held down on plate 3 at their junction ends, T3a by a bolt 91 extending through a bolt hole in an extension 93 of web 83 and hole 73 on side S3, and T4a by bolts 95 extending through certain of holes 31 in the plate (and through retaining clips 97).

Figure 9:
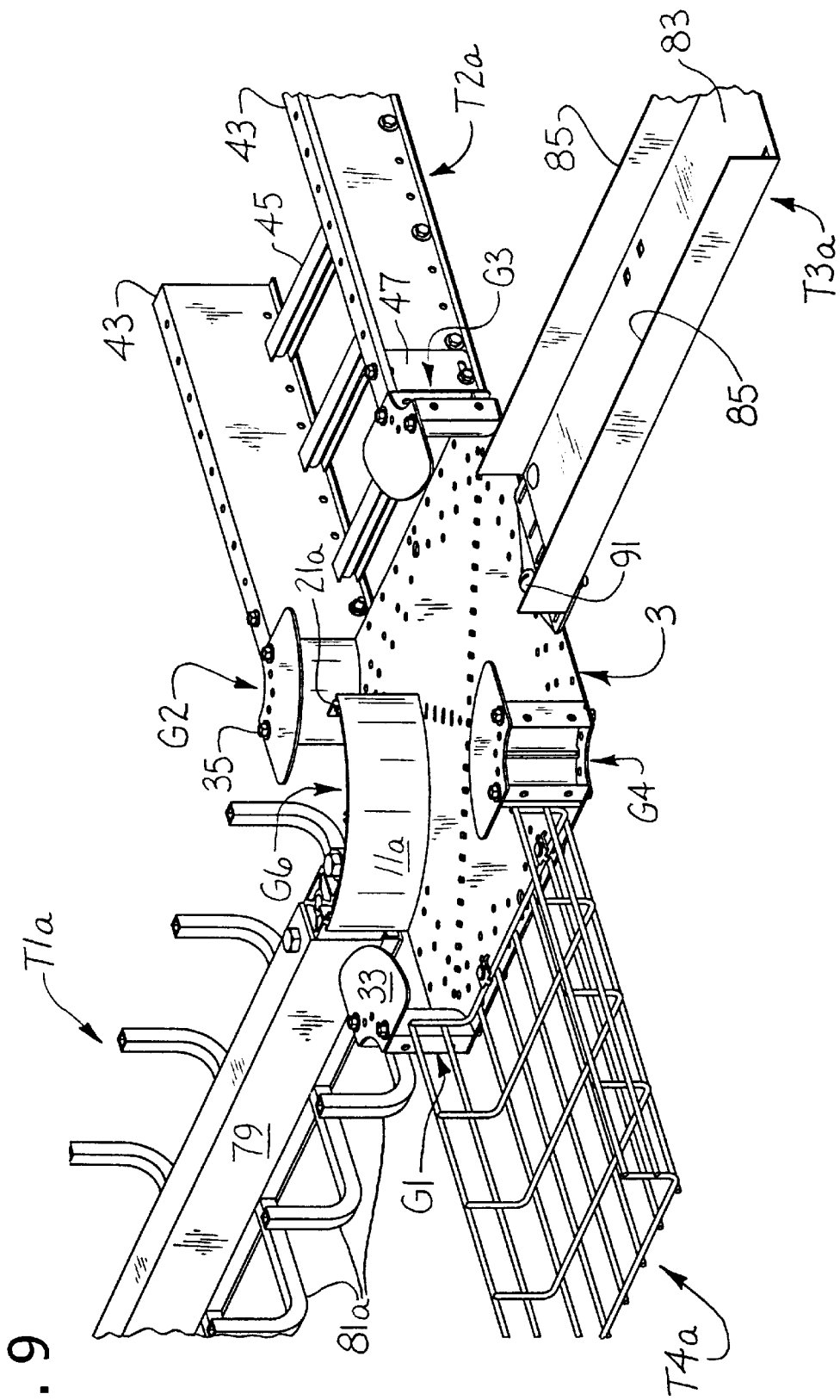
FIG. 9 a view like FIG. 6 showing an additional cable guide.
Figure 10:
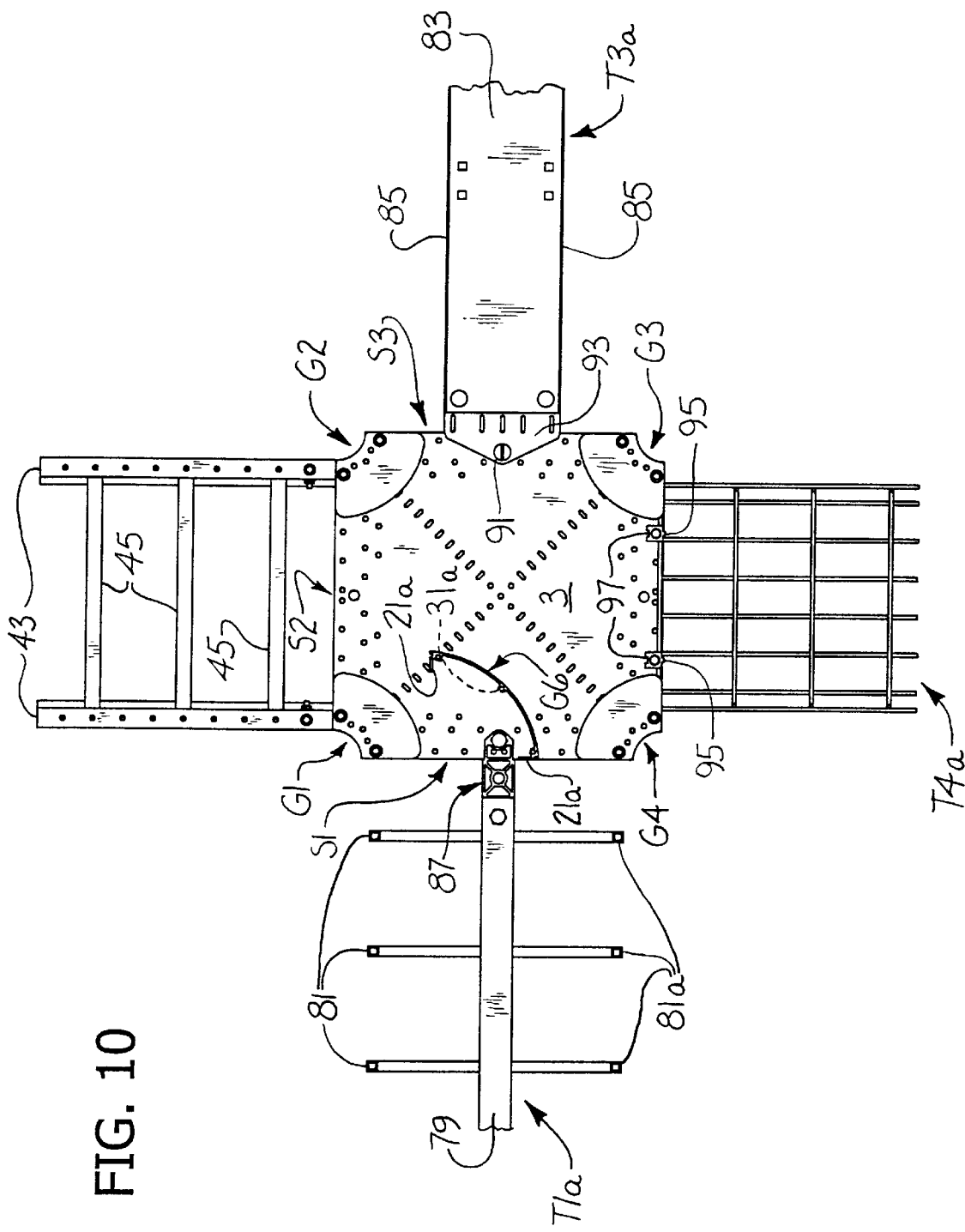
FIG. 10 is a plan of FIG. 9.

FIGS. 9 and 10 illustrate the same cruciform formation as FIGS. 6 and 7 showing the application of an additional cable guide G6 on the plate 3 for guiding cable being pulled around from the arms or rungs 81a at one side of rail 79 of tray T1a to the tray T2a (or vice versa). The guide G6 is just like a guide G1–G4 (the same reference characters as used for G1–G4 being applied thereto with the subscript a to identify corresponding parts thereof) except for being of greater radius of curvature to accommodate the transition from arms or rungs 81a of T1a to T2a, or from T2a to rungs 81 of T1a. It is removably fastened on the plate by self-tapping screws extending up through a hole 31, a hole 73, and a hole specially therefor (where indicated at 31a in FIG. 10) into the screw holes corresponding to holes 27 at the bottom thereof.

Figure 12:
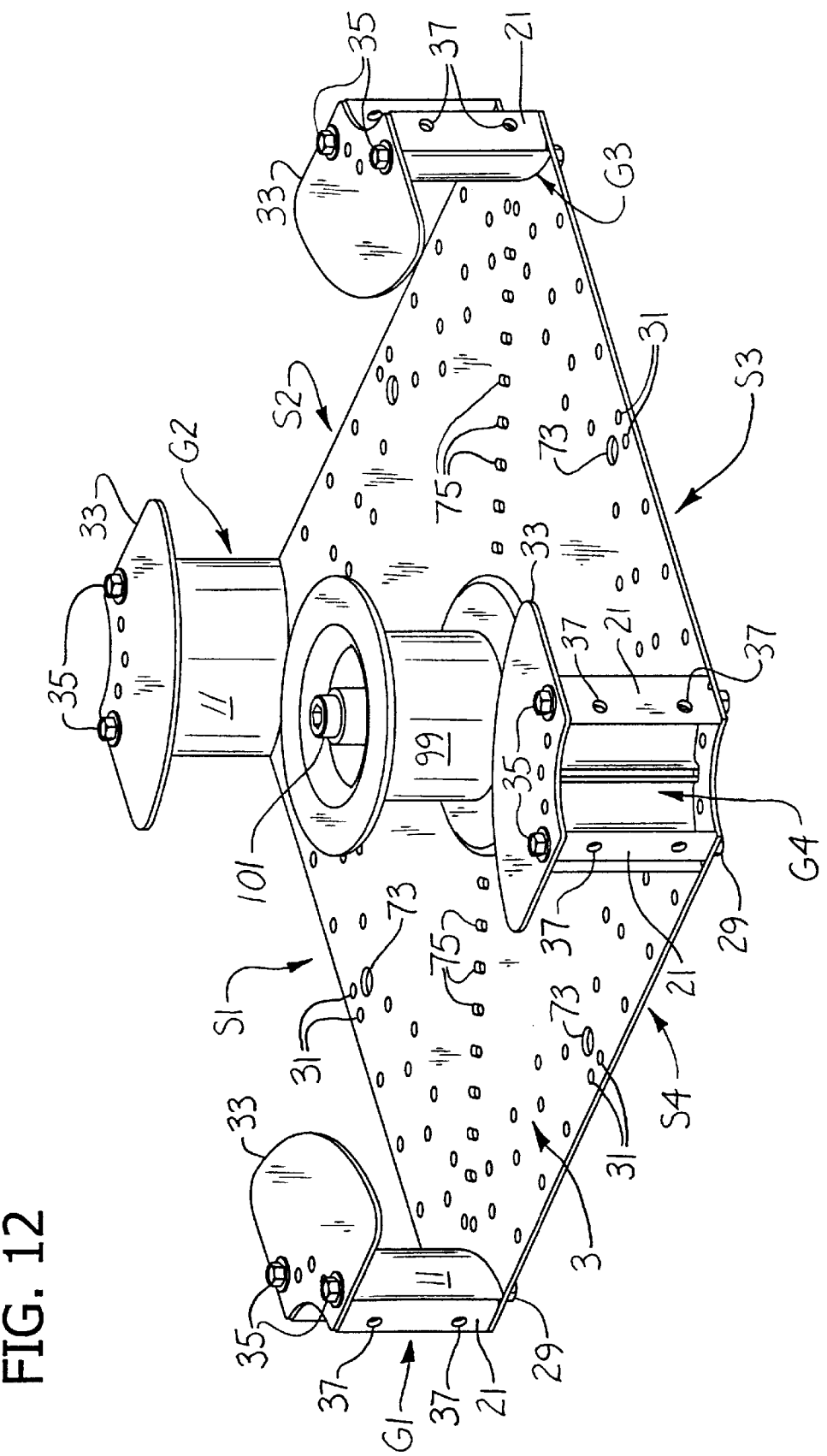
FIG. 12 is a view like FIG. 1 showing the addition of a pulley at the center of the plate.
Figure 13:
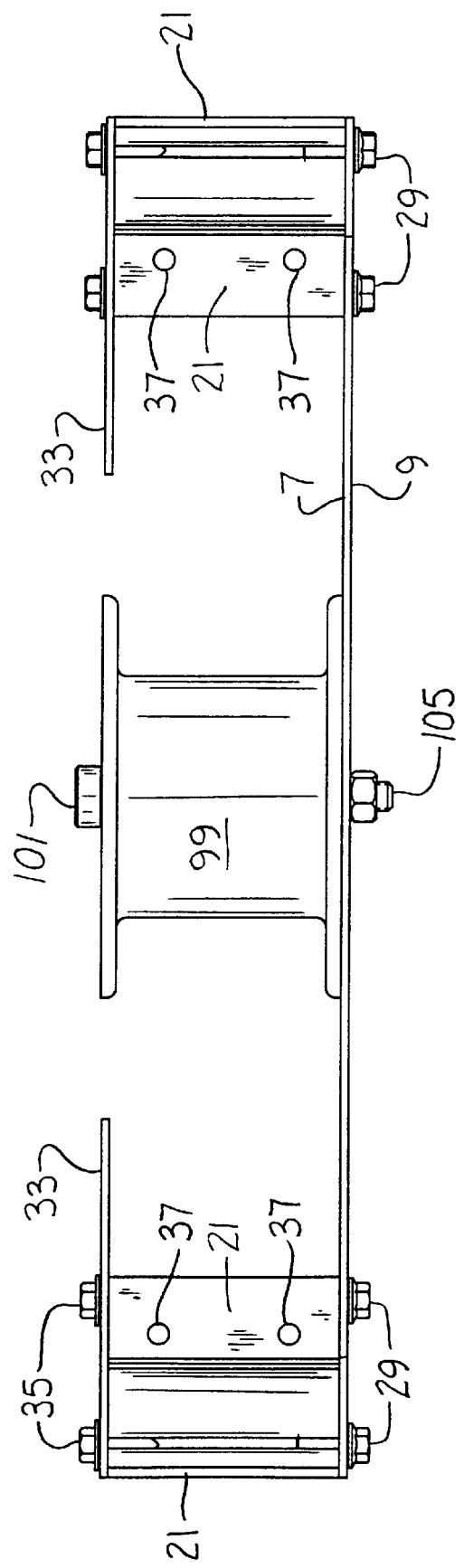
FIG. 13 is a side elevation of FIG. 12.

FIGS. 12 and 13 illustrate the provision of a pulley 99 such as may be used for cable guidance removably mounted at the center of the plate 3 by means of a bolt 101 extending down through the pulley (which is rotatable on the bolt) through a central hole 103 in the plate with a nut 105 threaded up on the bolt against the bottom of the plate. The hole 103 is also the central hole of the pattern of holes 77 which are for attachment of items other than the pulley, if desired. The pulley is of conventional construction and may be acquired from available sources (e.g., G B Electrical, Inc. of Milwaukee, Wis.).

Figure 14:
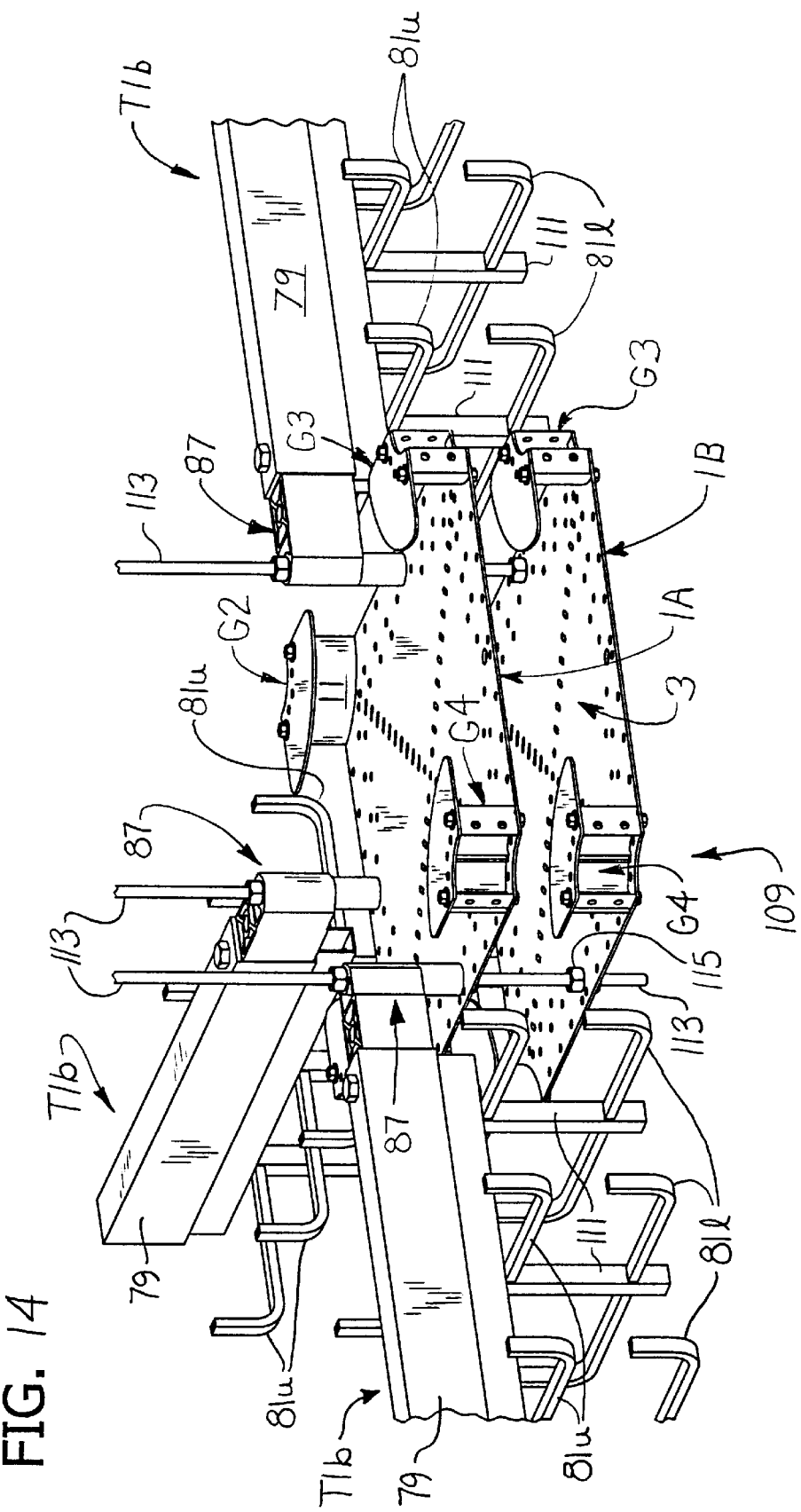
FIG. 14 is a perspective of a dual level junction system of the invention especially for cable trays of the type holding cable at two different levels.
Figure 15:
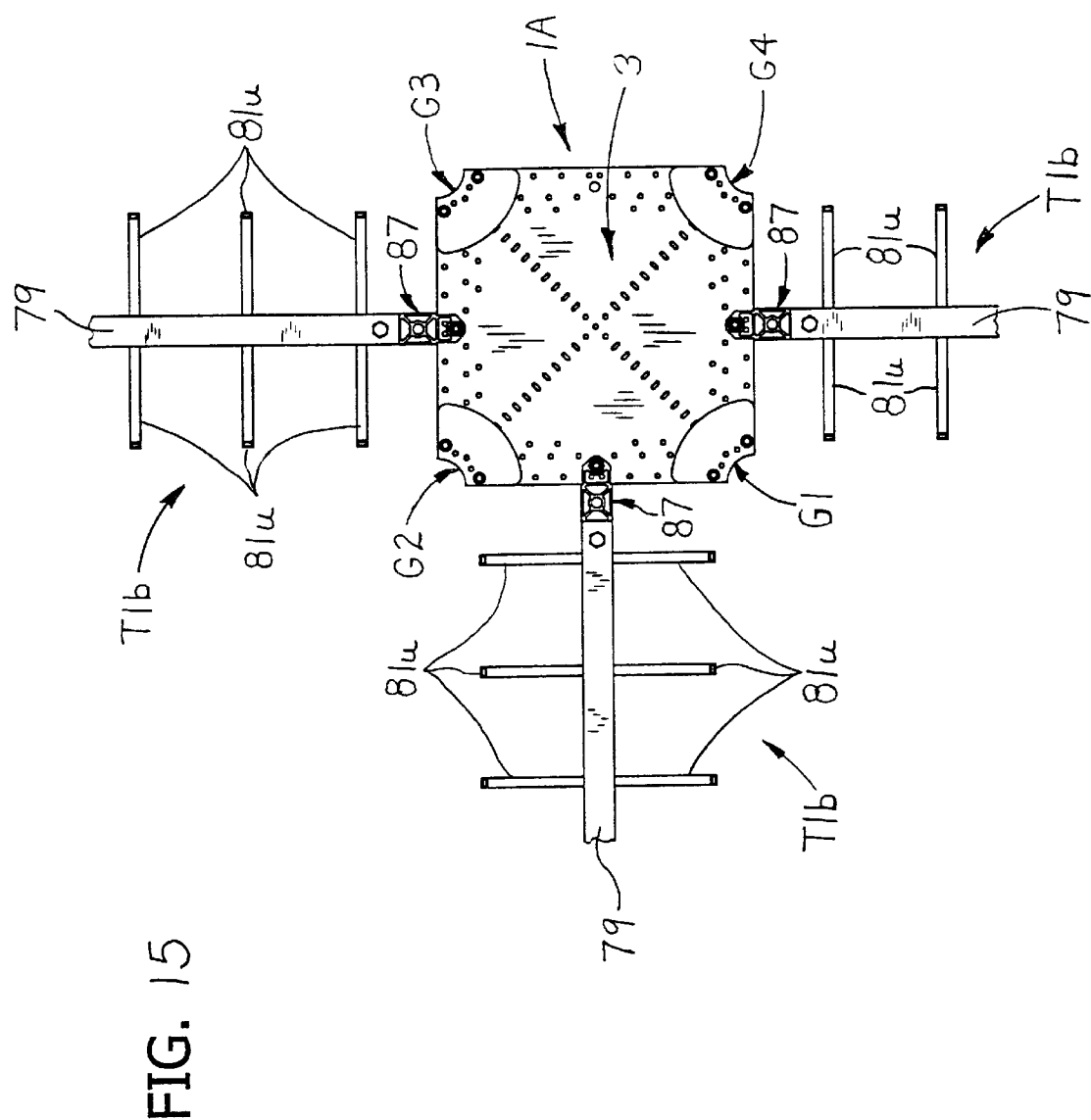
FIG. 15 is a plan of FIG. 14.
Figure 16:
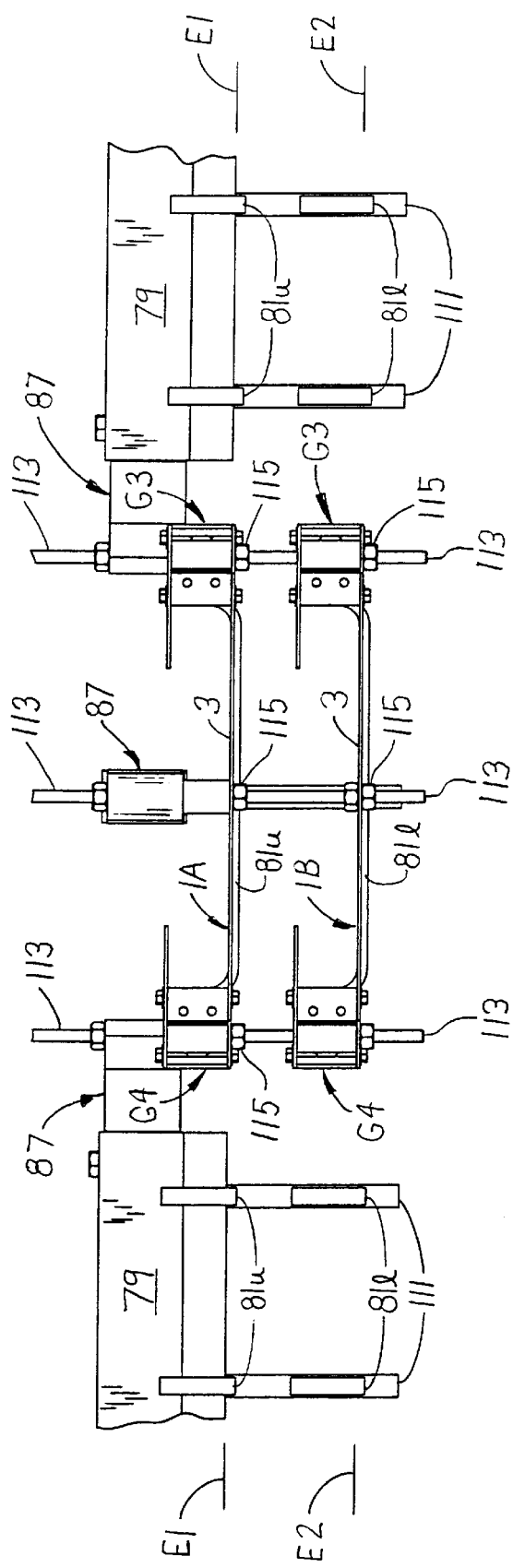
FIG. 16 is a side elevation of FIG. 14.

FIGS. 14–16 illustrate what may be termed a multi-level junction system 109 of this invention particularly for cable trays T1b generally of the type shown in FIGS. 17–22 of the aforesaid U.S. Pat. No. 5,816,542 having a rail 79 and cable supports constituted by arms 81 (rungs) extending laterally on both sides of bars 111 extending down from the rail for supporting cable at different elevations or levels. Two sets of arms are shown, an upper set 81u and a lower set 81l, for supporting cable at two different elevations or levels E1 and E2 as shown. The multi-level junction system 109 comprises an upper and a lower junction each the same as junction 1, the upper junction being specially designated 1A and the lower 1B. The plate 3 of the upper junction 1A is mounted with its upper face generally in the horizontal plane corresponding to level E1 of arms or rungs 81u and the plate 3 of the lower junction 1B is mounted with its upper face generally in the horizontal plane corresponding to level E2 of arms or rungs 81l. The mounting for the two junctions comprises rods 113 constituting hangers extending down as from the ceiling (not shown) beneath which the cable trays are mounted passing through the splice members 87 at the junction ends of rails 79 and through holes 73 in the plates 3 of both junctions 1A and 1B, the rods or hangers 113 being threaded and having nuts 115 threaded thereon for fastening the junctions on the hangers. Additional junctions may be added as needed to accommodate additional sets of arms 81 at additional elevations.

Figure 17:
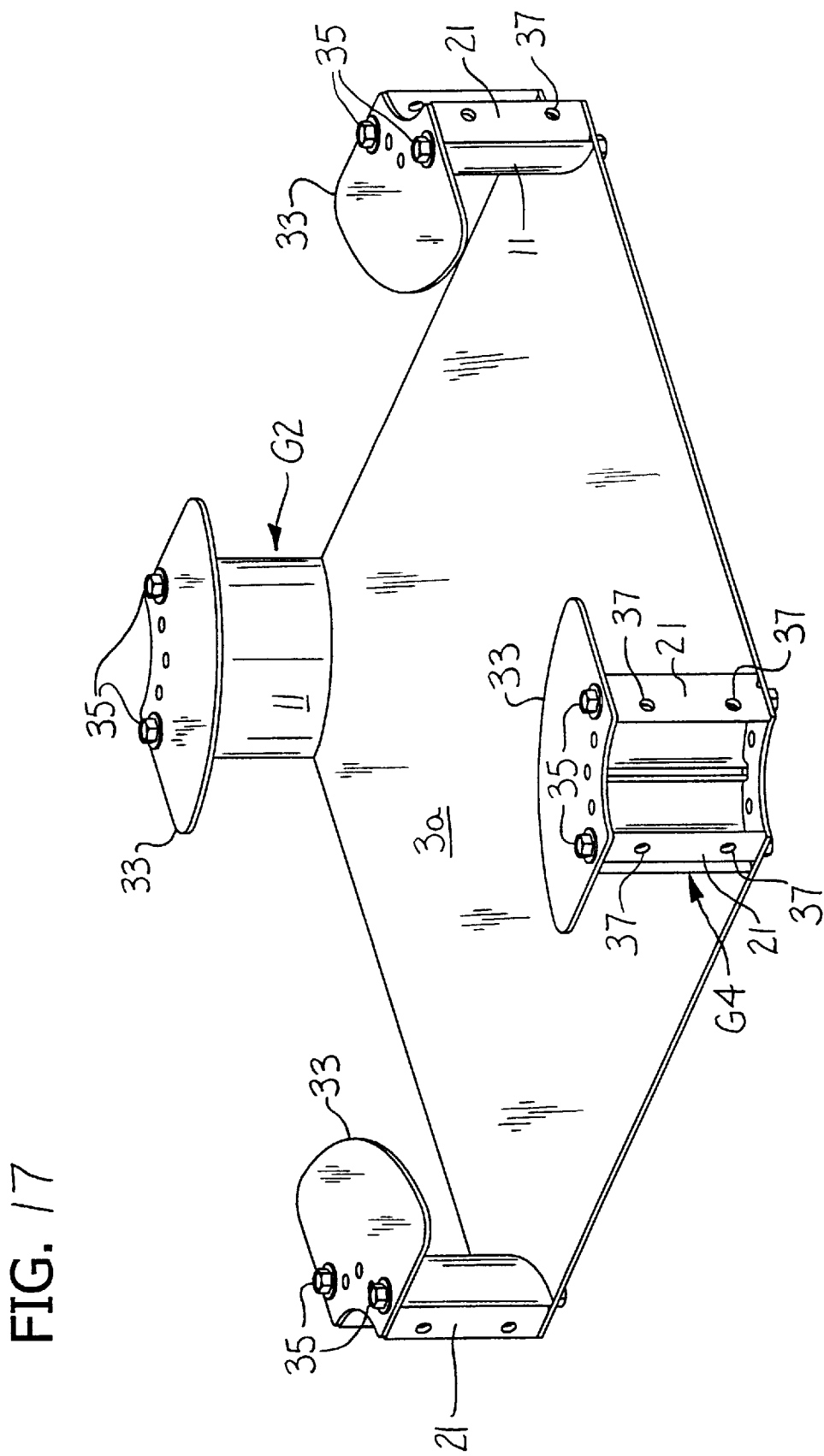
FIG. 17 is a perspective similar to FIG. 1 showing an alternative version of the junction including an imperforate plate.

FIG. 17 illustrates the junction as supplied with an imperforate plate 3a instead of a perforated plate for use by cable tray system installers who prefer to provide any necessary holes in the plate in the field, (or to have them custom-drilled on order). An imperforate plate 3a may also be used in situations where an enclosed cable tray system is preferred or required, in which case a junction cover panel of the type to be described hereinafter may be used.

Figure 18:
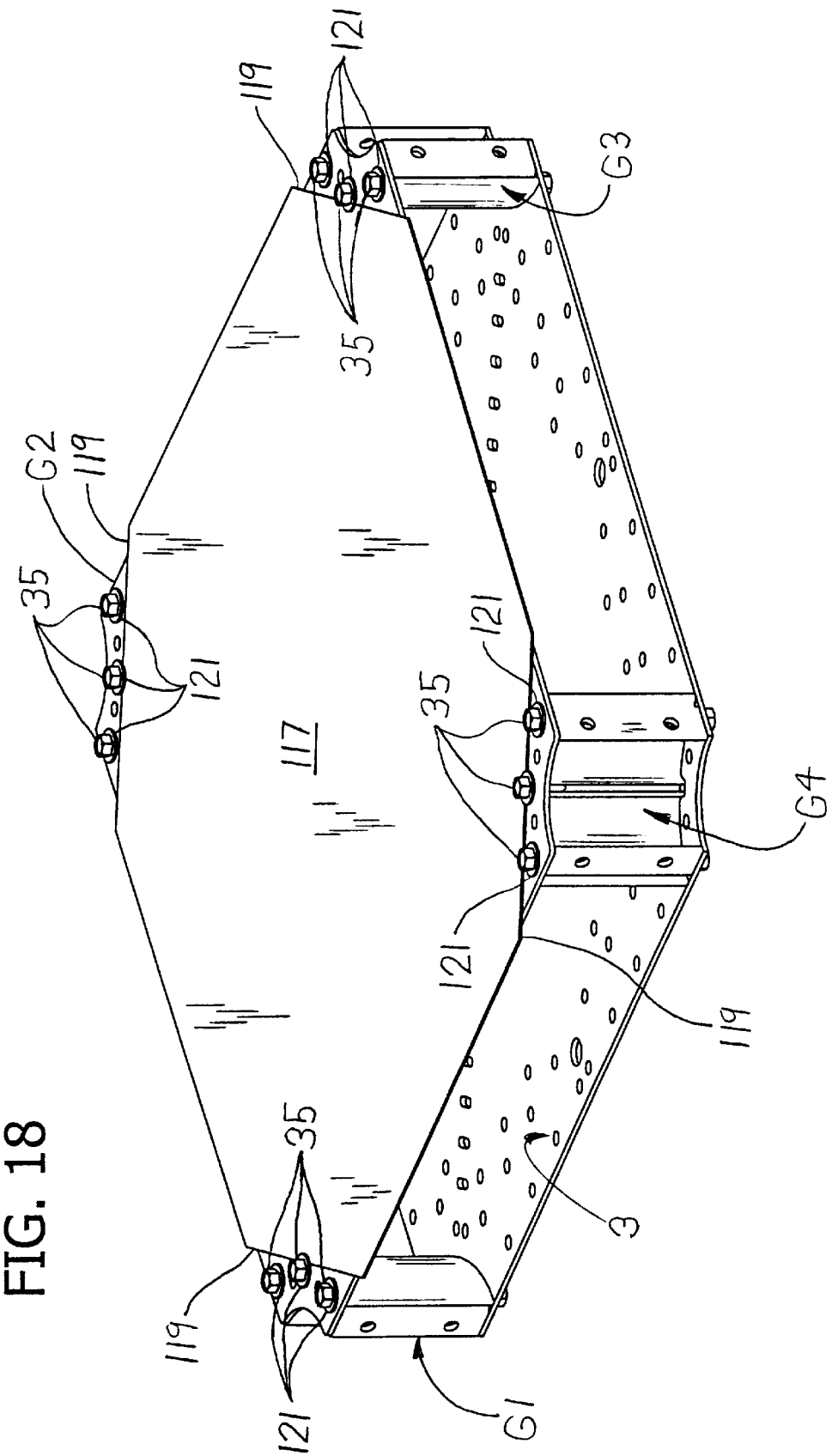
FIG. 18 is a perspective like FIG. 1 showing the addition of a cover plate.

FIG. 18 corresponds to FIG. 1 with the showing of the addition to the junction of FIG. 1 of a cover panel 117 constituted by a plate of generally square outline with corners cut away at a 45° angle as indicated at 119. The cover panel is fastened down on retainers 33 by the same screws 35 (and washers 121) holding the retainers 33 on the cable guides G1–G4, the heads of the screws and/or the washers being engageable with the cover to hold it in place. Alternatively, the cover could have extensions (e.g., tabs) which project out from the corners and have fastener openings therein in vertical alignment with the openings in the retainers 33 and cable guides G1–G4 to receive fasteners for securing the cover in place.

Figure 21:
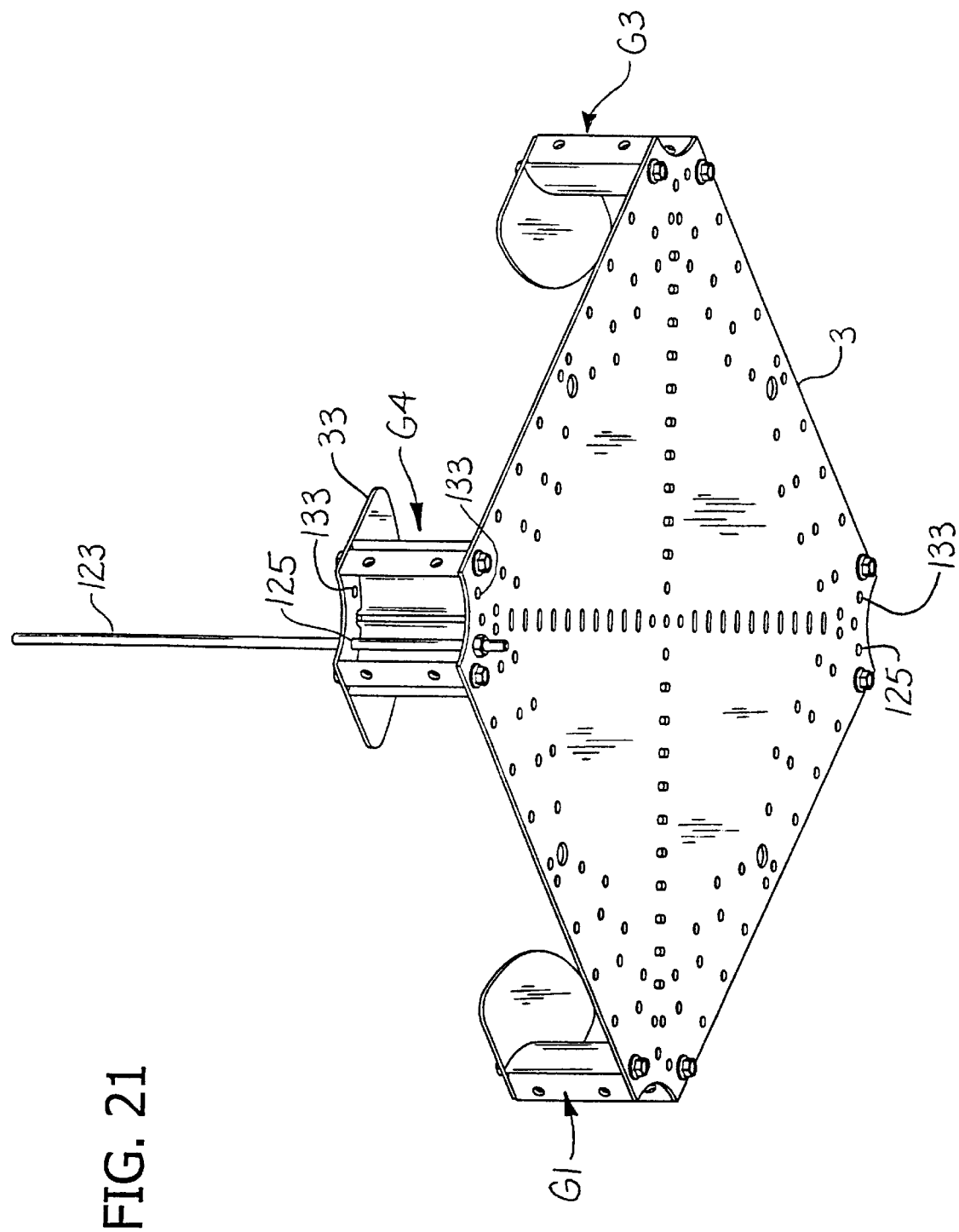
FIG. 21 is a perspective of an underside of the junction showing the plate supported by a support rod at one corner of the plate.
Figure 22:
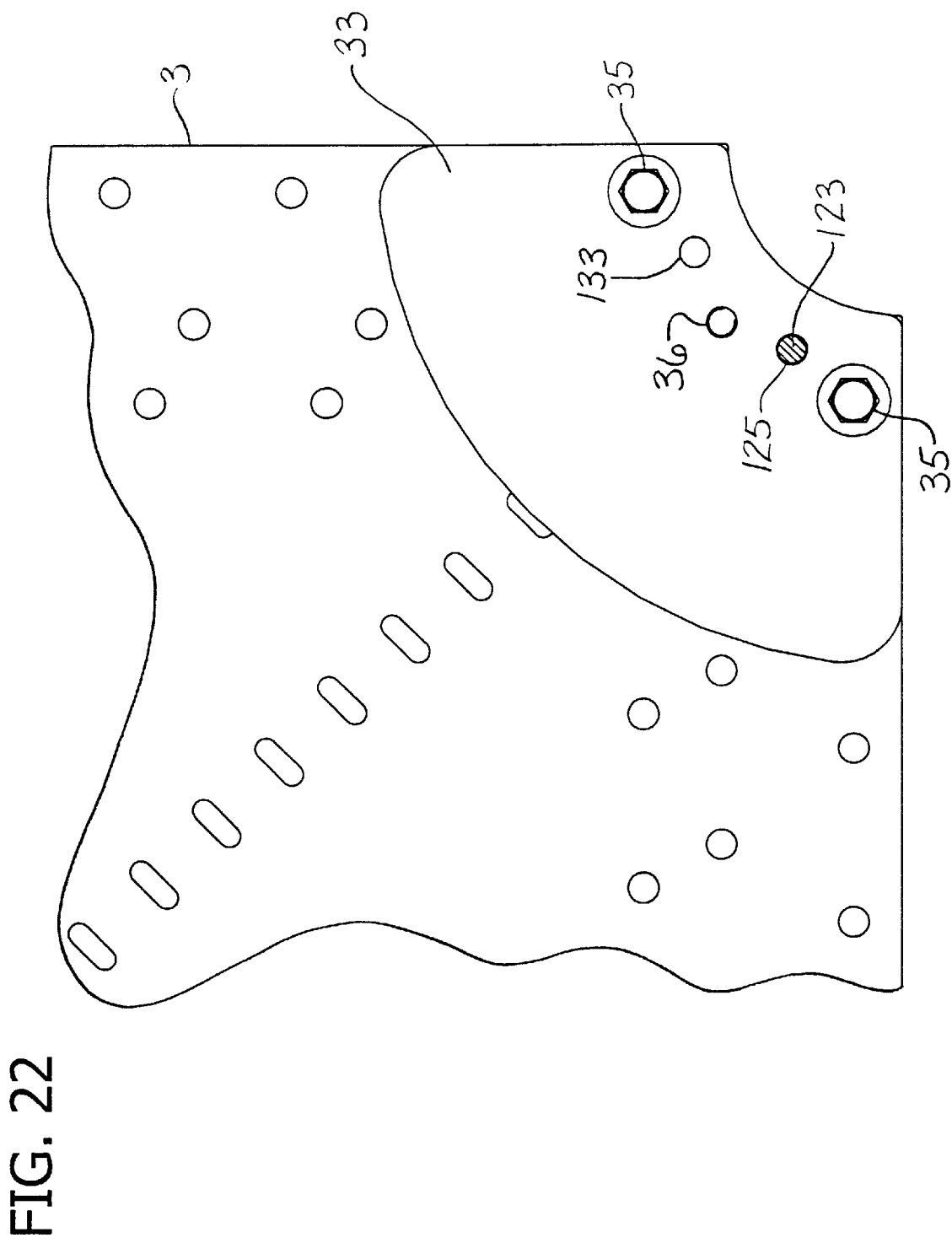
FIG. 22 is a top plan of a corner of the junction of FIG. 21.

FIGS. 21 and 22 shows a cable tray junction similar to FIG. 1, except that the plate 3 is supported at a desired elevation by support rods 123 (only one is shown). Each support rod extends down through a first set of vertically aligned support rod openings 125 in a respective retainer plate 33 and in the plate 3, and a nut 131 is threaded up on the lower end of the rod. A second set of vertically aligned support rod openings 133 in each retainer 33 and in the plate 3 provide an alternative location for the rod, or for placement of an additional rod if needed.

FIG. 23 shows a junction of FIG. 1 in which an accessory 137 is optionally secured to one of the cable guides (e.g., guide G4) by means of a self tapping screw 139 extending down through one of the screw holes 36 in the retainer plate 33 into a vertically aligned screw hole 25 in the cable guide (the aligned screw holes thus constituting accessory fastener openings in this embodiment). Alternatively, if a retainer plate 33 is not used on a cable guide, the accessory could be attached directly to the cable guide G4. Similarly, an accessory 147 can be attached on the underside of the plate 3 by means of a self tapping screw 149 extending up through one of the screw holes 31 in the plate 3 into a vertically aligned screw hole 27 in one of the cable guides G1–G4 (the aligned screw holes thus similarly constituting accessory fastener openings). While the accessories 137 and 147 are illustrated as being a conduit clamp and a bridal ring, respectively, it will be understood that virtually any cable tray accessory (e.g., electrical box, J-hook, side rail height extender) can be attached in the same or similar manner.

Figure 24:
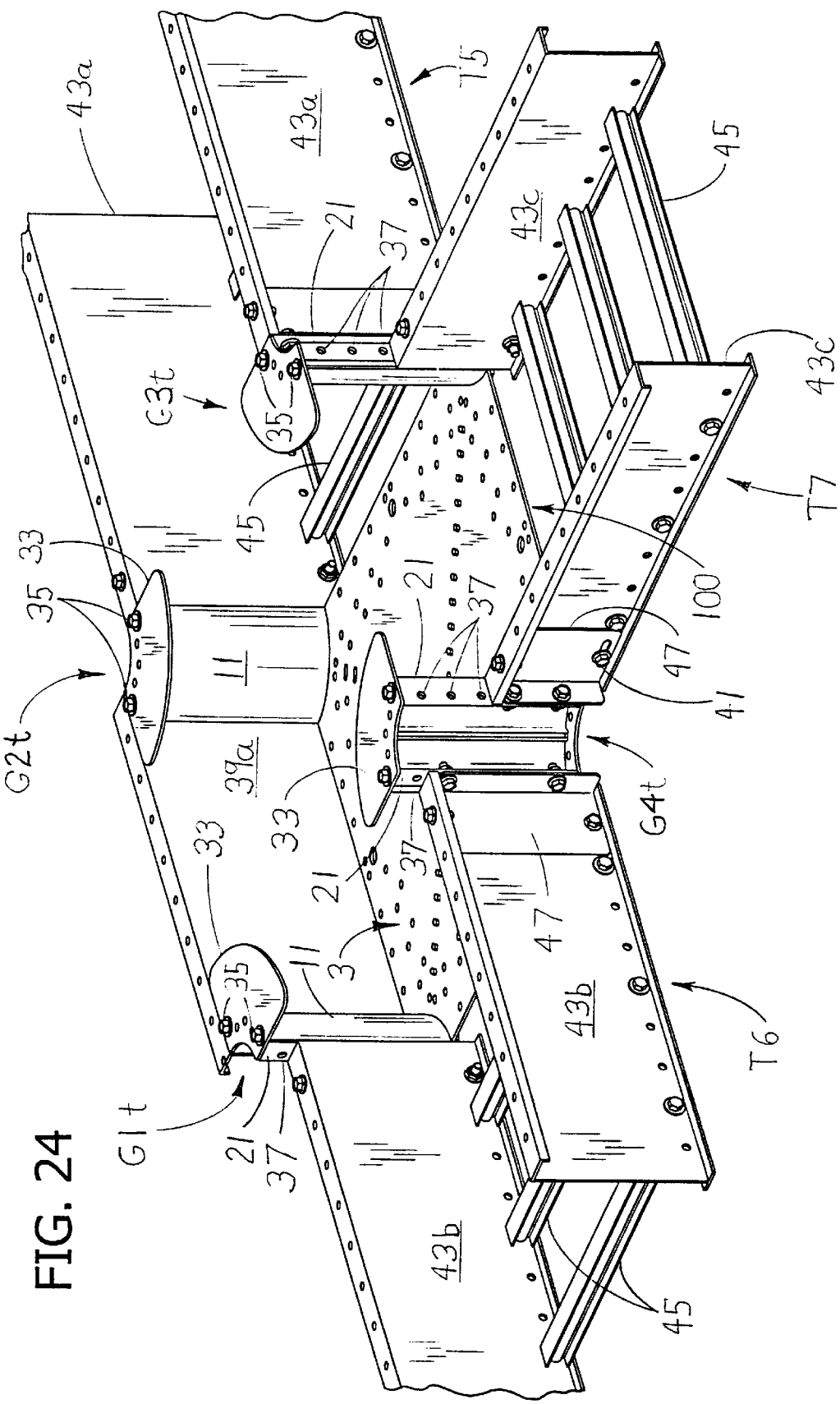
FIG. 24 is a perspective similar to FIG. 5 showing a modification of the cable guides of the junction shown in FIGS. 1 and 5 and three ladder-type cable trays having side three different heights attached to the guides in T-formation.

FIG. 24 shows a modification 100 of the junction 1 which is the same in respect to the plate 3 as junction 1, differing therefrom in that each of the four cable guides, designated G1t–G4t is of substantially greater height (substantially taller) than guides G1–G4. Otherwise the guides are the same and fastened on the plate 3 in the same way as guides G1–G4. The greater height of the guides (with provision of additional openings 27 in the flanges 21 of the guides) permits attachment of one or more ladder-type cable trays having side rails of greater height to the junction 100. Thus, FIG. 24 shows such a cable tray T5 having the relatively taller rails 43a attached to one of flanges 21 of guide G2t and one of flanges 21 of guide G3t. Further, FIG. 24 shows a ladder-type cable tray T6 having side rails 43b of an intermediate height attached to one of flanges 21 of guide G1t and one of flanges 21 of guide G4t, and a ladder-type cable tray T7 having side rails 43c of relatively small height attached to one of flanges 21 of guide G3t and one of flanges 21 of guide G4t. FIG. 24 also shows a relatively tall side wall 39a attached to one of flanges 21 of guide G1t and one of flanges 21 of guide G2t. Typically, each of the tall guides G1t–G4t is of the order (about) 1–6 inches tall and formed with holes 37 in their flanges 21 to accommodate side rails of ladder-type trays up to 6 inches in height.

Figure 25:
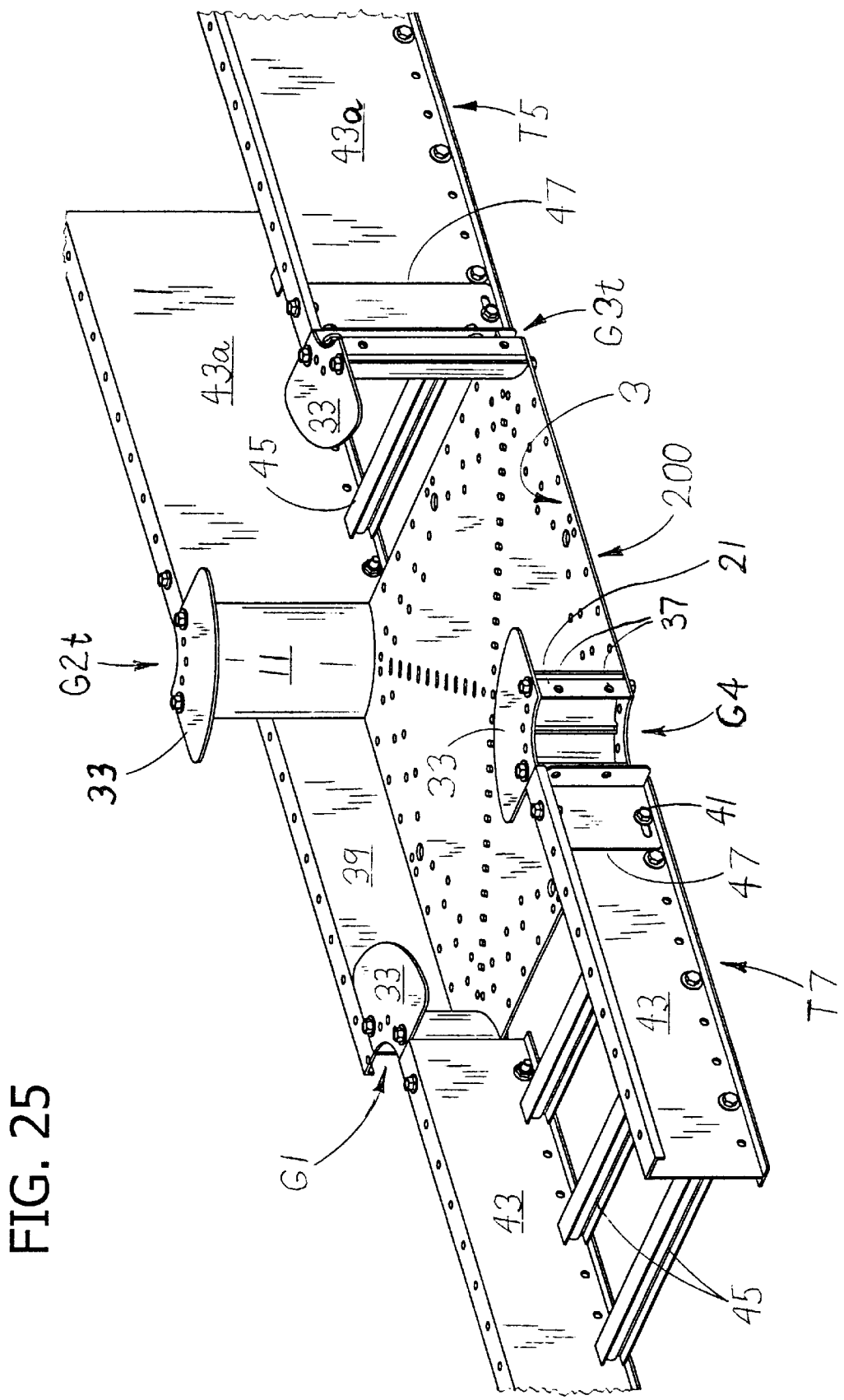
FIG. 25 is a perspective similar to FIG. 21 showing another modification of the cable guides and showing two ladder-type cable trays having side rails of two different heights attached to the guides in an in-line formation.

FIG. 25 shows another modification 200 of junction 1 which again is the same in respect to the plate 3 as junction 1, differing therefrom in that two of the cable guides, G2t and G3t are just like the tall guides G2t and G3t of junction 100, the other two being the same as G1 and G2 of junction 1. It will be understood that the greater height of guides G2t and G3t permits attachment of side rails 43a of ladder-type cable tray T5 to one of flanges 21 of guide G2t and one of flanges 21 of guide G3t. Cable tray T7 is attached to guides G1 and G4, and a side wall 39 is attached to guides G1 and G2t.

It will be observed from the foregoing that the cable tray junction of this invention is designed to facilitate pulling of cable from one tray to another without damage to the cable. Further, the junction is designed to accommodate many different cable tray configurations, including cable trays intersecting in L-formation, T-formation, cruciform formation; and cable trays of different types, widths and rail heights. Still further, the junction can be perforate or imperforate, as preferred. If needed, the junctions can also be mounted in multi-tier formation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense. For example, while the junction plate 3 in the preferred embodiment is generally rectangular (e.g., square), other shapes may also be possible. Also, the term "plate" as used herein is intended to encompass any type of panel member, not just sheet metal plate. Further, while the retainer 33 described above is advantageous for confining cable bundles to the curved surfaces of the cable guides, it will be understood that the junction can be used without these retainers, as when small cable bundles are being pulled. Still further, the cable guides could take other shapes and be fabricated differently, so long as the guides have curved surfaces configured to avoid cable damage during pulling. As noted above, the present invention is directed to both imperforate and perforated junction plates, but it will be understood that the provision of pre-formed fastener openings in the plate provides substantial benefits, including enabling the cable guides to be readily moved to different locations, depending on the cable tray configuration required.

What is claimed is:

1. A junction for the joinder of convergent cable trays comprising a panel for interconnection of the trays with one face of the panel facing upwardly thereby constituting its upper face, said panel having at least two sides, and at least one cable guide extending up from said upper face adjacent at least one of said sides of the panel having a curved surface for guiding cable as it is pulled around from one tray to another, a radius of the curved surface being from about 1 to 6 inches so as to enable the bending of the cable as it is pulled around said curved surface while preserving the integrity of the cable, said cable guide being removably fastened on the panel.

2. A junction as set forth in claim 1 for the joinder of trays for the stringing of data transmission cable, said curvature being such as to enable the bending of the data transmission cable while maintaining the quality of its data transmission.

3. A junction as set forth in claim 1 wherein the cable guide is removable and fastenable in different positions on the panel corresponding to a width of the respective tray.

4. A junction as set forth in claim 3 wherein the cable guide is removably fastened on the panel by threaded fasteners extending up through pre-formed holes in the panel.

5. A junction as set forth in claim 1 for the connection of two trays in L-formation, said panel comprising a plate having two sides generally at right angles to one another meeting at a corner, said guide being removably fastened adjacent said corner.

6. A junction as set forth in claim 1 for connection of three trays in T-formation, said panel comprising a plate having three sides generally at right angles to one another meeting at two corners, said junction having two of said guides removably fastened thereon, one adjacent each corner.

7. A junction as set forth in claim 1 for connection of four trays in cruciform formation, said panel comprising a plate having four sides generally at right angles one to another meeting at four corners, said junction having four of said guides removably fastened thereon, one adjacent each corner.

8. A junction for connection of two cable trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, adjacent said corners, each of said guides having a curved surface for guiding cable as it is pulled around from one tray to another at right angles thereto, the curvature of said surface being such as to enable the bending of the cable as it is pulled around said curved surface while preserving the integrity of the cable.

9. A junction as set forth in claims 8 for the joinder of trays for the stringing of data transmission cable, the curvature of said curved surface of each guide being such as to enable the bending of the data transmission cable without adversely affecting its data transmission quality.

10. A junction as set forth in claim 8 wherein each cable guide is removably fastened on the plate with the said curved surface thereof extending around the respective corner and is removable and fastenable in different positions on the plate.

11. A junction as set forth in claim 10 wherein the said curved surface thereof is an arcuate surface extending about 90° of arc.

12. A junction as set forth in claim 11 wherein each cable guide has radial surfaces at the ends of the arcuate surface for making an attachment thereto.

13. A junction as set forth in claim 12 having side walls at two sides thereof which meet at a corner removably attached to respective radial surfaces, said side walls being removable for attachment of cable trays to respective radial surfaces.

14. A junction as set forth in claim 11 wherein the radius of said arcuate surface is from about 1 to 6 inches.

15. A junction as set forth in claim 14 wherein the radius of said arcuate surface is about three inches.

16. A junction as set forth in claim 8 wherein each cable guide has formations at the ends of the curved surface thereof for making an attachment.

17. A junction as set forth in claim 16 having side walls at two sides thereof which meet at a corner removably attached to respective formations, said side walls being removable for attachment of cable trays to respective formations.

18. A junction as set forth in claim 8 wherein each cable guide has a bottom seated on the upper face of the plate and is removably fastened on the plate by screws extending up through holes in the plate.

19. A junction as set forth in claim 18 having screw holes therein along each of the four sides in a pattern for receiving screws for fastening one or more of said guides on the plate in position spaced inward from a corner.

20. A junction as set forth in claim 18 wherein said plate is imperforate except for screw holes at the corners.

21. A junction as set forth in claim 8 wherein each cable guide has a top retainer extending inward from the curved surface thereof for confining cable to the curved surface.

22. A junction as set forth in claim 21 wherein each cable guide has a flat top surface and the retainer comprises a flat flange removably fastened on said flat top surface.

23. A junction as set forth in claim 22 wherein each said flange is removably fastened on the top surface of the respective cable guide by screws extending through holes in the flange into the guide.

24. A junction as set forth in claim 8 wherein each cable guide comprises a curved strip, extending in about a 90° arc of a circle and having a convex side presenting said curved surface and a concave side, a bottom, a top, end flanges extending outward from the concave side in generally radial planes at about right angles to one another, and pairs of ribs extending heightwise on the concave side, the two ribs of each pair forming screw holes at the bottom and top, each guide being removably fastened on the plate by screws extending up through holes in the plate threaded in the screw holes at the bottom.

25. A junction as set forth in claim 24 wherein the arc is on a radius ranging from 1 to 6 inches.

26. A junction as set forth in claim 25 wherein the arc is on a radius of about three inches.

27. A junction as set forth in claim 8 having a cover plate thereon fastened on the guides.

28. A junction system for the joinder of convergent cable trays having cable supports for supporting cable at different levels, said system comprising a plurality of junctions each as set forth in claim 1, one at each of said different levels.

29. A junction system as set forth in claim 28 wherein a lower level junction is hung below a higher level junction.

30. A junction system as set forth in claim 29 having hangers extending through holes in said junctions, said hangers having fasteners thereon fastening the junctions thereto.

31. A junction system for the joinder of cable trays each comprising a rail having supports for supporting cable at different levels, said system including a plurality of junctions, each comprising a plate for interconnection of two, three or four cable trays with one face of the plate facing upwardly thereby constituting its upper face, said plate having a plurality of sides a plurality of corners, and a plurality of cable guides extending up from said upper face of the plate, adjacent said corners, each of said guides having a curved surface for guiding cable as it is pulled around from one tray to another at right angles thereto, the curvature of said surface being such as to enable the bending of the cable as it is pulled around said curved surface while preserving the integrity of the cable, and wherein the upper faces of the plates of said junctions are generally in planes at said different levels.

32. A junction for connection of two cable trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, adjacent said corners, each cable guide being removably fastened on the plate by fasteners extending up through pre-formed holes in the plate arranged in a predetermined pattern.

33. A junction for connection of two cable trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, adjacent said corners, each cable guide having a top retainer extending inward with respect to the plate for confining cable thereto.

34. A junction as set forth in claim 33 wherein each retainer comprises a flat flange removably fastened on the respective guide.

35. A junction as set forth in claim 33 wherein said retainer has a support rod opening therein for receiving a support therethrough used for supporting the junction at a selected elevations.

36. A junction as set forth in claim 35 wherein said plate has a support rod opening therein vertically aligned with said support opening in the retainer for receiving said support rod therethrough.

37. A junction for connection of two cable trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, adjacent said corners, each of said guides being removably fastened on the plate by fasteners extending up through holes in a predetermined pattern, said plate having sets of pre-formed holes each in said pattern along each of said plurality of sides for fastening one or more of said guides on the plate in position spaced inward from a corner.

38. A junction for connection of two cable trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, adjacent said corners, said guide being formed for connection to selected pairs thereof of one type of cable tray, and said plate being formed on each side thereof for connection of other types of cable tray.

39. A junction for connection of two c able trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, adjacent said corners, and a pulley removably mounted on the plate for rotation on an axis generally perpendicular to the plate.

40. A junction as set forth in claim 39 wherein the pulley is rotary on a bolt extending through a hole generally at the center of the plate.

41. A junction for connection of two cable trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, adjacent said corners, said guides being about 1–6 inches high.

42. A junction for connection of two cable trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, adjacent said corners, said guides being of different height.

43. A junction for connection of two or more cable trays, said junction comprising a panel having an upper face, a plurality of sides, a plurality of corners, a plurality of cable guides extending up from said upper face adjacent said corners, said cable guides being removably fastened to said panel, and a cover adapted to be removably fastened to the cable guides in a covering position overlying the panel and spaced therefrom, said cable guides having cover fastener openings therein for receiving fasteners to removably fasten the cover in said covering position.

44. A junction as set forth in claim 43 wherein said cover fastener openings extend down from a top surface of the cable guide.

45. A junction as set forth in claim 44 wherein said panel and cable guides have vertically aligned accessory fastener openings therein for receiving accessory fasteners to fasten accessories on the underside of the panel.

46. A junction as set forth in claim 43 further comprising a top retainer on each cable guide extending inwardly with respect to the panel for confining cable thereto, said top retainers having cover fastener openings therein aligned with said cover fastener openings in said cable guides for receiving said cover fasteners.

47. A junction as set forth in claim 46 wherein said top retainers are removably fastened to said cable guides.

48. A junction for connection of two or more cable trays, said junction comprising a panel having an upper face, a plurality of sides, a plurality of corners, and a plurality of cable guides extending up from said upper face adjacent said corners, said cable guides having accessory fastener openings therein for receiving accessory fasteners to releasably fasten accessories to the cable guides.

49. A junction as set forth in claim 48 wherein said accessory fastener openings extend down from a top surface of said cable guides.

50. A junction as set forth in claim 4 wherein said panel and cable guides have vertically aligned accessory fastener openings therein for receiving fasteners to fasten accessories on the underside of the panel.

51. A junction as set forth in claim 48 further comprising a top retainer on each cable guide extending inwardly with respect to the panel for confining cable thereto, said top retainers having accessory fastener openings therein aligned with the accessory fastener openings in said cable guides for receiving said accessory fasteners.

52. A junction as set forth in claim 51 wherein said top retainers are removably fastened to said cable guides.

53. A junction for connection of two or more cable trays, said junction comprising a panel having an upper face, a plurality of sides, a plurality of corners, and a plurality of cable guides extending up from said upper face adjacent said corners, said cable guides being removably fastened to said panel and having accessory fastener openings therein for receiving accessory fasteners to releasably fasten accessories to the cable guides.

54. A junction as set forth in claim 53 further comprising a top retainer on each cable guide extending inwardly with respect to the panel for confining cable thereto, said top retainers having accessory fastener openings therein aligned with the accessory fastener openings in said cable guides for receiving said accessory fasteners.

55. A junction for connection of two cable trays in L-formation, three cable trays in T-formation, or four cable trays in cruciform formation, said junction comprising a plate for interconnection of two, three or four trays with one face of the plate facing upwardly thereby constituting its upper face, said plate having a plurality of sides, a plurality of corners, and a plurality of cable guides extending up from said upper face of the plate, at least one of said cable guides being removably fastened to the plate and spaced in from said corners based on a width of one of said cable trays, each of said guides having a curved surface for guiding cable as it is pulled around from one tray to another at right angles thereto, the curvature of said surface being such as to enable the bending of the cable as it is pulled around said curved surface while preserving the integrity of the cable.

56. A junction as set forth in claim 55 for the joinder of trays for the supporting of data transmission cable, a radius of the curved surface being from about 1 to 6 inches so as to enable the bending of the data transmission cable without adversely affecting its data transmission quality.

57. A junction as set forth in claim 55 wherein another of said cable guides is removably fastened on the plate with the said curved surface thereof extending around one of said corners and is removable and fastenable in different positions on the plate.

58. A junction as set forth in claim 55 wherein the said curved surface thereof is an arcuate surface extending about 90° of arc.

59. A junction as set forth in claim 58 wherein the radius of said arcuate surface is about three inches.

60. A junction as set forth in claim 55 wherein each cable guide has formations at the ends of the curved surface thereof for making an attachment.

61. A junction as set forth in claim 60 having side walls at two of said sides which meet at a corner removably attached to respective formations, said side walls being removable for attachment of cable trays to respective formations.

62. A junction as set forth in claim 58 wherein each cable guide has radial surfaces at the ends of the arcuate surface for making an attachment thereto.

63. A junction as set forth in claim 62 having side walls at two of said sides which meet at a corner removably attached to respective radial surfaces, said side walls being removable for attachment of cable trays to respective radial surfaces.

* * * * *